(12) United States Patent
Ishio et al.

(10) Patent No.: US 6,723,400 B1
(45) Date of Patent: *Apr. 20, 2004

(54) LAMINATES FOR MAKING ELECTROCONDUCTIVE FUEL TUBES

(75) Inventors: Atsushi Ishio, Aichi (JP); Norio Shimasaki, Aichi (JP); Masaru Tateyama, Aichi (JP); Kazuhiko Kobayashi, Aichi (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,327

(22) Filed: Dec. 11, 1997

(30) Foreign Application Priority Data

Dec. 16, 1996 (JP) .............................. 8-335877
Feb. 26, 1997 (JP) .............................. 9-042764

(51) Int. Cl.$^7$ .............................................. B32B 27/08
(52) U.S. Cl. ................... 428/35.7; 138/137; 428/36.91; 428/419
(58) Field of Search ................................ 525/133, 150, 525/179; 428/36.9, 36.91, 419, 35.7; 138/137

(56) References Cited

U.S. PATENT DOCUMENTS

| | | | | |
|---|---|---|---|---|
| 4,011,121 A | * | 3/1977 | Doss ........................... | 156/82 |
| 4,654,255 A | * | 3/1987 | Kojima et al. ............... | 428/261 |
| 4,795,671 A | * | 1/1989 | Shiiki et al. ................. | 428/209 |
| 5,451,642 A | * | 9/1995 | Abe et al. .................... | 525/511 |
| 5,498,372 A | * | 3/1996 | Hedges ........................ | 252/511 |
| 5,524,673 A | * | 6/1996 | Noone et al. ................ | 138/103 |
| 5,571,866 A | * | 11/1996 | Nishida et al. ................ | 525/98 |
| 5,792,532 A | | 8/1998 | Pfleger ....................... | 428/36.9 |
| 5,849,415 A | * | 12/1998 | Shalaby et al. ............. | 428/419 |

FOREIGN PATENT DOCUMENTS

| | | |
|---|---|---|
| EP | 0 435 044 A2 | 7/1991 |
| EP | 0 551 094 A1 | 7/1993 |
| EP | 0 702 182 A1 | 3/1996 |
| JP | 06016936 A * | 1/1994 |
| JP | 02200415 A * | 3/1997 |

* cited by examiner

Primary Examiner—Sandra M. Nolan
(74) Attorney, Agent, or Firm—Piper Rudnick LLP

(57) ABSTRACT

An electroconductive, multilayered hollow molding comprising at least two thermoplastic resin layers, in which at least one layer is a layer of (a) a thermoplastic resin composition consisting essentially of a polyphenylene sulfide resin; one layer is a layer of (b) a thermoplastic resin composition consisting essentially of a thermoplastic resin other than a polyphenylene sulfide resin; and at least one of the layers is a layer of an electroconductive, thermoplastic resin composition comprising an electroconductive filler and/or an electroconductive polymer, and a thermoplastic resin.

19 Claims, No Drawings

LAMINATES FOR MAKING ELECTROCONDUCTIVE FUEL TUBES

TECHNICAL FIELD

The present invention relates to electroconductive, multilayered hollow moldings with good and well-balanced heat resistance, hot water resistance, chemical resistance, gasohol permeation resistance, outward appearance, interlayer adhesion and low-temperature stiffness.

BACKGROUND ART

For producing hollow moldings of thermoplastic resins, widely known are various techniques. For example, known is a technique of blow molding of polyamide resins to produce ducts to be in the car engines, and a technique of extrusion molding of saturated polyester resins, polyamide resins, polyolefin resins and thermoplastic polyurethanes to produce tubes.

However, since conventional, single-layered hollow moldings of polyamide resins, saturated polyester resins, polyolefin resins or thermoplastic resins such as polyurethane resins have poor heat resistance, hot water resistance and chemical resistance, their applications are limited. Therefore, products with improved heat resistance, hot water resistance and chemical resistance are desired.

For fuel tubes for cars, generally used are polyamide resins, in particular, soft polyamide resins such as polyamide 11 and polyamide 12. However, it is said that tubes made from only such polyamide resins do not have good alcohol-gasoline permeation resistance, which is required for preventing environmental pollution and for lowering fuel expenses. Some improvements in those tubes are required.

Where hollow blow moldings or tube moldings are used as tubes and where non-conductive liquids such as fuel are run therein, those moldings are often charged. In those cases, therefore, it is desired to prevent the moldings from being charged.

On the other hand, polyphenylene sulfide resins (hereinafter referred to as PPS resins) are engineering plastics with good heat resistance, hot water resistance, chemical resistance and flame resistance, while having good electric characteristics. There is increasing a great demand for the applications of those PPS resins to electric and electronic parts and also to car parts. Recently, Japanese Patent Publication No. 2-200415 has disclosed tubular moldings comprising PPS resins, referring to the characteristics of the resins.

Hollow moldings of such PPS resins could solve the problems in poor heat resistance, hot water resistance, chemical resistance and gas permeation resistance such as those mentioned above, but are often still unsatisfactory in stiffness, especially low-temperature stiffness that is often required for use in cars. Therefore, the applications of those hollow moldings are limited.

Japanese Patent Application Laid-Open No. 7-299855 discloses multilayered tubes comprising a PPS layer, in which is referred to a method for improving the interlayer adhesion of those multilayered tubes by activating the surface of the PPS layer through corona processing. However, secondary processing such as corona processing is disadvantageous in view of its cost, and is, therefore, unfavorable. In addition, nothing is referred to in the laid-open specification with respect to the stiffness of the multilayered tubes.

On the other hand, various studies have heretofore been made for making PPS resins electroconductive. For example, Japanese Patent Application Laid-Open No. 60-53560 discloses electroconductive PPS resin compositions comprising PPS resin and electroconductive carbon black; and Japanese Patent Application Laid-Open No. 1-272665 discloses electroconductive PPS mixtures comprising PPS resin, electroconductive carbon black, and graphite. However, no disclosure is given in any of those laid-open specifications with respect to hollow moldings of electroconductive PPS resins, and, in addition, nothing is referred to therein with respect to any specific resin characteristics and any specific resin compositions that may target the improvements in the blow moldability and the tube moldability of the resin compositions and in the interlayer adhesion of the moldings of the resin compositions. Needless to say, no disclosure is given in those laid-open specifications with respect to multilayered hollow moldings to be prepared by laminating electroconductive PPS resin layers.

It is known to incorporate an electroconductive filler into thermoplastic resins, for example, as in Japanese Patent Application Laid-Open No. 54-113640. However, our studies have revealed that such known resin compositions could be molded in injection molding or the like in which the moldings being produced are pressed against molds under high pressure. However, these bring about some problems when applied to hollow molding such as blow molding or tube molding, in which any high pressure is not applied to the surface of the molding being produced. Specifically, when the known resin compositions are applied to such hollow molding, the surfaces of the resulting moldings are often roughened so that the moldings do not have good surface smoothness. In addition, the extrusion molding conditions for the known resin compositions are narrowly limited, and even the extrusion molding devices applicable to them are also limited. For these reasons, we have found that the known resin compositions could not be simply applied to such hollow molding. Moreover, we have further found that the surface roughness of the moldings have some negative influences on the strength of the moldings.

Given this situation, we have conducted further studies in order to solve the problems with those conventional, multilayered hollow moldings. As a result, we have achieved the present invention. Specifically, the invention is to provide electroconductive, multilayered hollow moldings with good and well-balanced heat resistance, hot water resistance, chemical resistance, alcohol-gasoline permeation resistance, stiffness, low-temperature stiffness, surface smoothness and interlayer adhesion.

DISCLOSURE OF THE INVENTION

The invention provides the following moldings and compositions.

1. An electroconductive, multilayered hollow molding comprising at least two thermoplastic resin layers, in which at least one layer is a layer of (a) a thermoplastic resin composition consisting essentially of a polyphenylene sulfide resin, at least one layer is a layer of (b) a thermoplastic resin composition consisting essentially of a thermoplastic resin other than a polyphenylene sulfide resin, and at least one layer is a layer of an electroconductive resin composition comprising an electroconductive filler and/or an electroconductive polymer, and a thermoplastic resin.

2. An electroconductive, multilayered hollow molding comprising at least three thermoplastic resin layers, in which at least one layer is a layer of (a) a polyphenylene sulfide resin composition, at least one layer is a layer of (b) a thermoplastic resin composition consisting essentially of a thermoplastic resin other than a polyphenylene sulfide resin, and at least one layer is a layer of (c) an electroconductive, thermoplastic resin composition comprising an electroconductive filler and/or an electroconductive polymer.

3. An electroconductive, multilayered hollow molding composed of two thermoplastic resin layers, in which one layer is a layer of (a') an electroconductive resin composition consisting essentially of a polyphenylene sulfide resin, and the other layer is a layer of (b) a thermoplastic resin other than a polyphenylene sulfide resin.

4. The electroconductive, multilayered hollow molding of 2, which is composed of three layers, an interlayer of (a) a polyphenylene sulfide resin composition, an outermost layer of (b) a thermoplastic resin composition consisting essentially of a thermoplastic resin other than a polyphenylene sulfide resin, and an innermost layer of (c) an electroconductive, thermoplastic resin composition comprising an electroconductive filler and/or an electroconductive polymer.

5. The electroconductive, multilayered hollow molding of 2, which is composed of three layers, an innermost layer of (a) a polyphenylene sulfide resin composition, an outermost layer of (b) a thermoplastic resin composition consisting essentially of a thermoplastic resin other than a polyphenylene sulfide resins, and an interlayer of (c) an electroconductive, thermoplastic resin composition comprising an electroconductive filler and/or an electroconductive polymer.

6. The electroconductive, multilayered hollow molding of any one of 1 to 5, in which the thermoplastic resin other than a polyphenylene sulfide resin that constitutes the layer (b) is at least one selected from polyamide resins, thermoplastic polyester resins, thermoplastic polyurethane resins and polyolefin resins.

7. The electroconductive, multilayered hollow molding of any one of 1 to 6, in which the thermoplastic resin composition consisting essentially of a thermoplastic resin other than a polyphenylene sulfide resins that constitutes the layer (b) has a Young's modulus of not larger than 18,000 kg/cm².

8. The electroconductive, multilayered hollow molding of any one of 1 to 7, in which the resin that constitutes the layer (b) is a polyamide resin comprising constitutional amido units each having from 8 to 15 carbon atoms per one amido group.

9. The electroconductive, multilayered hollow molding of any one of 1 to 8, in which the polyphenylene sulfide resin composition that constitutes the layer (a) comprises (A) 100 parts by weight of a polyphenylene sulfide resin and (B) from 1 to 200 parts by weight of an olefinic copolymer containing at least one functional group selected from epoxy groups, acid anhydride groups, carboxyl group and its salts, and carboxylate groups.

10. The electroconductive, multilayered hollow molding of 9, in which the functional group having olefinic copolymer (B1) to be in the polyphenylene sulfide resin composition that constitutes the layer (a) is an epoxy group having olefinic copolymer (B1) consisting essentially of an a-olefin and a glycidyl ester of an a,b-unsaturated acid.

11. The electroconductive, multilayered hollow molding of 10, in which the epoxy group having olefinic copolymer (B1) to be in the polyphenylene sulfide resin composition that constitutes the layer (a) is an olefinic copolymer (B1) comprising (1) an a-olefin, (2) a glycidyl ester of an a,b-unsaturated acid, and (3) a monomer to be represented by the following general formula:

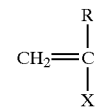

wherein R¹ represents a hydrogen atom or a lower alkyl group; X represents a group selected from —COOR², —CN and aromatic groups; and R² represents an alkyl group having from 1 to 10 carbon atoms.

12. The electroconductive, multilayered hollow molding of any one of 9 to 11, in which the polyphenylene sulfide resin composition that constitutes the layer (a) comprises at least two, functional group-having olefinic copolymers (B) of (B1) an epoxy group-having olefinic copolymer and (B2) an acid anhydride group-having olefinic copolymer, and in which the ratio in terms of % by weight of (B1) to (B2), (B1)/(B2), falls between 1/99 and 99/1 with the total of (B1) and (B2) being 100% by weight.

13. The electroconductive, multilayered hollow molding of any one of 9 to 12, in which the polyphenylene sulfide resin composition that constitutes the layer (a) further contains (C) from 1 to 200 parts by weight, relative to 100 parts by weight of the polyphenylene sulfide resin (A), of an elastomer having no epoxy groups, acid anhydride groups, carboxyl group and its salts, and carboxylate groups, with the total of the functional group-having olefinic copolymer (B) and the elastomer (C) being not larger than 200 parts by weight relative to 100 parts by weight of the polyphenylene sulfide resin (A).

14. The electroconductive, multilayered hollow molding of any one of 9 to 13, in which the polyphenylene sulfide resin composition that constitutes the layer (a) further contains (D) from 5 to 200 parts by weight, relative to 100 parts by weight of the polyphenylene sulfide resin (A), of a thermoplastic resin consisting essentially of repeating units as bonded together via at least one bonding mode selected from amido bonds, ester bonds and urethane bonds.

15. The electroconductive, multilayered hollow molding of 14, in which the thermoplastic resin (D) is a polyamide resin.

16. The electroconductive, multilayered hollow molding of any one of 9 to 15, in which the polyphenylene sulfide resin composition that constitutes the layer (a) further contains (E) from 0.05 to 5 parts by weight, relative to 100 parts by weight of the polyphenylene sulfide resin (A), of an alkoxysilane compound having at least one functional group selected from epoxy groups, amino groups, isocyanato groups, hydroxyl groups, mercapto groups and ureido groups.

17. The electroconductive, multilayered hollow molding of any one of 1 to 16, in which the polyphenylene sulfide resin (A) to be in the polyphenylene sulfide resin-composition that constitutes the layer (a) is a de-ionized one.

18. The electroconductive, multilayered hollow molding of any one of 2 and 4 to 17, in which the electroconductive, thermoplastic resin composition that constitutes the layer (c) comprises 100 parts by weight of a resin composition comprising (F) from 0 to 98% by weight of a thermoplastic resin, (B) from 2 to 60% by weight of an olefinic copolymer having at least one functional group selected from epoxy groups, acid anhydride groups, carboxyl group and its salts, and carboxylate groups, and (C) from 0 to 58% by weight of an elastomer having no epoxy groups, acid anhydride groups, carboxyl group and its salts, and carboxylate groups, and (G) from 1 to 100 parts by weight of an electroconductive filler or an electroconductive polymer.

19. The electroconductive, multilayered hollow molding of any one of 2 and 4 to 18, in which the electroconductive filler or polymer (G) to be in the electroconductive, thermoplastic resin composition that constitutes the layer (c) is either a non-fibrous one or a fibrous one having a ratio, length/diameter, of not larger than 200.

20. The electroconductive, multilayered hollow molding of 19, in which the electroconductive filler (G) to be in the electroconductive, thermoplastic resin composition that constitutes the layer (c) is carbon black.

21. The electroconductive, multilayered hollow molding of 20, in which the electroconductive filler (G) to be in the electroconductive, thermoplastic resin composition that constitutes the layer (c) is carbon black having a specific surface area (as measured in a BET method) of not smaller than 500 $m^2/g$.

22. The electroconductive, multilayered hollow molding of any one of 2 and 4 to 21, in which the thermoplastic resin (F) to be in the electroconductive, thermoplastic resin composition that constitutes the layer (c) is at least one selected from polyphenylene sulfides, polyamide resins, and thermoplastic polyester resins.

23. The electroconductive, multilayered hollow molding of any one of 18 to 22, in which the thermoplastic resin (F) to be in the resin composition for the layer (c) is a polyphenylene sulfide resin, and the electroconductive, thermoplastic resin composition that constitutes the layer (c) is a polyphenylene sulfide resin composition comprising at least two, functional group having olefinic copolymers (B) of (B1) an epoxy group having olefinic copolymer and (B2) an acid anhydride group having olefinic copolymer with the ratio in terms of % by weight of(B1) to (B2), (B1)/(B2), falling between 1/99 and 99/1 and with the total of (B1) and (B2) being 100% by weight.

24. The electroconductive, multilayered hollow molding of any one of 1 to 23, in which the electroconductive, thermoplastic resin composition that constitutes the layer (c) has a volume resistivity of not larger than $10^{10}$·cm.

25. The electroconductive, multilayered hollow molding of any one of 1 to 24, in which the electroconductive, thermoplastic resin composition that constitutes the layer (c) has a volume resistivity of larger than 100·cm but not larger than $10^{10}$·cm.

26. The electroconductive, multilayered hollow molding of any one of 2 and 4 to 25, which has a total thickness falling between 0.2 mm and 3 mm and wherein the thickness of the electroconductive layer falls between 1% and 50% of the total thickness of the molding.

BEST MODES OF CARRYING OUT THE INVENTION

The electroconductive, multilayered hollow molding of the invention basically comprises at least two thermoplastic resin layers, in which at least one layer is a layer of (a) a thermoplastic resin composition consisting essentially of a polyphenylene sulfide resin, and at least one layer is a layer of (b) a thermoplastic resin composition consisting essentially of a thermoplastic resin other than a polyphenylene sulfide resin, and in which at least one layer comprises an electroconductive filler and/or an electroconductive polymer, and a thermoplastic resin.

First described hereinunder are the thermoplastic resins other than the polyphenylene sulfide resins and the thermoplastic resin composition consisting essentially of a thermoplastic resin other than a polyphenylene sulfide resin, which can constitute the layer (b).

The thermoplastic resins other than the polyphenylene sulfide resins that constitute the layer (b) is not specifically defined, and may include, for example, saturated polyester resins, polysulfone resins, polyethylene tetrafluoride resins, polyether-imide resins, polyamidimide resins, polyamide resins, polyimide resins, polycarbonate resins, polyether-sulfone resins, polyether-ketone resins, polythioether-ketone resins, polyether-ether-ketone resins, thermoplastic polyurethane resins, polyolefin resins, ABS resins, polyamide elastomers, polyester elastomers, etc. These can be used as mixtures of two or more. Of those, preferred are polyamide resins, thermoplastic polyester resins, thermoplastic polyurethane resins, and polyolefin resins.

The polyamide resins consist essentially of amino acids, lactams or diamines, and dicarboxylic acids. As examples of the essential constituent components, mentioned are amino acids such as 6-aminocaproic acid, 11-aminoundecanoic acid, 12-aminododecanoic acid, e-ethylbenzoic acid; lactams such as e-caprolactam, w-laurolactam; aliphatic, alicyclic and aromatic diamines such as tetramethylene-diamine, hexamethylene-diamine, undecamethylene-diamine, dodecamethylene-diamine, 2,2,4-/2,4,4-trimethylhexamethylene-diamine, 5-methyl-nonamethylene-diamine, metaxylylene-diamine, paraxylylene-diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, 2-methylpentamethylene-diamine; and aliphatic, alicyclic and aromatic dicarboxylic acids such as adipic acid, suberic acid, azelaic acid, sebacic acid, dodecane-diacid, terephthalic acid, isophthalic acid, 2-chloroterephthalic acid, 2-methylterephthalic acid, 5-methylisophthalic acid, 5-sodium-sulfoisophthalic acid, hexahydroterephthalic acid, hexahydroisophthalic acid. Polyamide homopolymers and copolymers to be derived from those starting compounds are used in the invention either singly or as combined.

The polyamide resins usable in the invention include, for example, polycapramide (nylon 6), polyhexamethylene-adipamide (nylon 66), polytetramethylene-adipamide (nylon 46), polyhexamethylene-sebacamide (nylon 610), polyhexamethylene-dodecamide (nylon 612), polydode-canamide (nylon 12), polyundecanamide (nylon 11), polyhexamethylene-terephthalamide (nylon 6T), polyxylylene-adipamide (nylon XD6), and their mixtures and copolymers.

Of the polyamide resins, preferred are those comprising constitutional amido units each having from 8 to 15 carbon atoms per one amido group. More preferred are those derived from monomers of aminocarboxylic acids or their derivatives, as producing moldings with better low-temperature stiffness. As examples of such preferred polyamide resins, mentioned are polydodecanamide (nylon 12), nylon 610, nylon 6T/2 copolymer and polyundecanamide (nylon 11).

The degree of polymerization of those polyamide resins is not specifically defined, and may be from 1.5 to 7.0, preferably from 2.0 to 6.5, more preferably from 2.5 to 5.5, in terms of the relative viscosity thereof as measured in a 98% concentrated sulfuric acid solution (containing 1 g of the polymer in 100 ml of concentrated sulfuric acid) at 25 C, or may be from 1.0 to 7.0, preferably from 1.5 to 5.0, in terms of the relative viscosity thereof as measured in metacresol (having a polymer concentration of 0.5% by weight) at 25° C.

The thermoplastic polyester resins usable in the invention are those to be obtained from dicarboxylic acids, such as terephthalic, acid and aliphatic diols. In addition to terephthalic acid, the dicarboxylic acids include, for example, aliphatic dicarboxylic acids having from 2 to 20 carbon atoms, such as azelaic acid, sebacic acid, adipic acid, dodecane-dicarboxylic acid; aromatic dicarboxylic acids such as isophthalic acid, naphthalene-dicarboxylic acid; and alicyclic dicarboxylic acids such as cyclohexane-dicarboxylic acid. These can be used either singly or as combined. The aliphatic diols include, for example, ethylene glycol, propylene glycol, 1,4-butane-diol, trimethylene glycol, 1,4-cyclohexane-dimethanol, and hexamethylene glycol.

Preferred examples of the thermoplastic polyesters for use in the invention are polyethylene terephthalate, polypropylene terephthalate, polybutylene terephthalate, polyhexamethylene terephthalate, polycyclohexylene-dimethylene terephthalate, and polyethylene naphthalene-dicarboxylate. Of those, especially preferred are polybutylene terephthalate, and copolyesters comprising a dicarboxylic acid component that is comprised of terephthalic acid in an amount of 60 mol % or more, preferably 70 mol % or more, and dodecane-dicarboxylic acid and/or isophthalic acid, and a diol component of 1,4-butane-diol, as they have good mechanical strength.

The degree of polymerization of those thermoplastic polyester resins is not specifically defined. For example, for polybutylene terephthalate (hereinafter referred to as PBT resin) and copolyesters which are preferably used in the invention, it is preferred that they have a degree of polymerization of from 0.5 to 2.5, more preferably from 0.8 to 2.0, in terms of the relative viscosity thereof as measured in a 0.5% orthochlorophenol solution at 25° C. For polyethylene terephthalate, it is preferred that the polymer has a degree of polymerization of from 0.54 to 1.5, more preferably from 0.6 to 1.2, in terms of its limiting viscosity as measured in a 0.5% orthochlorophenol solution at 25° C.

The thermoplastic polyurethane resins usable in the invention are linear polymers comprising polyisocyanates and diols. As examples of the polyisocyanates, mentioned are 2,4-tolylene diisocyanate, hexamethylene diisocyanate, metaxylene diisocyanate, and 4,4'-diphenylmethane diisocyanate. The diols include polyester-type ones and polyether-type ones. Examples of the former are polyesterdiols to be produced from organic acids, such as phthalic acid, adipic acid, linoleic acid dimer, maleic acid, and glycols such as ethylene glycol, propylene glycol, butylene glycol, diethylene glycol; and those of the latter are polyoxypropylene glycol, poly(oxypropylene)-poly(oxymethylene) glycol, poly(oxybutylene) glycol, and poly(oxytetramethylene)glycol.

The degree of polymerization of those thermoplastic polyurethanes is not specifically defined, but, in general, may be from 1,000 to 100,000 poises, in terms of the melt viscosity as measured at 220° C. and at a shear rate of 10/sec.

The polyolefin resins usable in the invention include, for example, polyethylene, polypropylene, polyethylene chloride, polypropylene chloride, and polymethylpentene.

The thermoplastic resin composition which consists essentially of a thermoplastic resin except polyphenylene sulfide resins, such as that mentioned hereinabove, and which constitutes the layer (b) may contain additives such as plasticizer and others that are suitable for the resin.

Preferably, the thermoplastic resins other than the polyphenylene sulfide resins and the thermoplastic resin composition that are to constitute the layer (b) have a Young's modulus of not larger than 18,000 kg/cm², more preferably not larger than 15,000 kg/cm², in view of the kink resistance of the tubular moldings of the invention.

The thermoplastic resin composition consisting essentially of a thermoplastic resin except polyphenylene sulfide resins, which is used to form the layer (b), is meant to indicate that the weight proportion of the thermoplastic resin other than the polyphenylene sulfide resins is the largest among other resin components except low-molecular additives such as plasticizer in the composition.

Now described in detail hereinunder is the polyphenylene sulfide resin (PPS resin) composition that constitutes the layer (a).

The PPS resin to be in the composition is a polymer comprising repeating units of the following structural formula in an amount of preferably 70 mol % or more, more preferably 90 mol % or more of all repeating units.

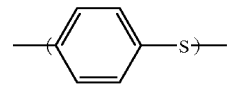

Polymers comprising the repeating units in an amount of smaller than 70 mol % are unfavorable, as having poor heat resistance. The PPS resin may comprise repeating units of any of the following structural formulae in an amount of smaller than 30 mol % of all repeating units.

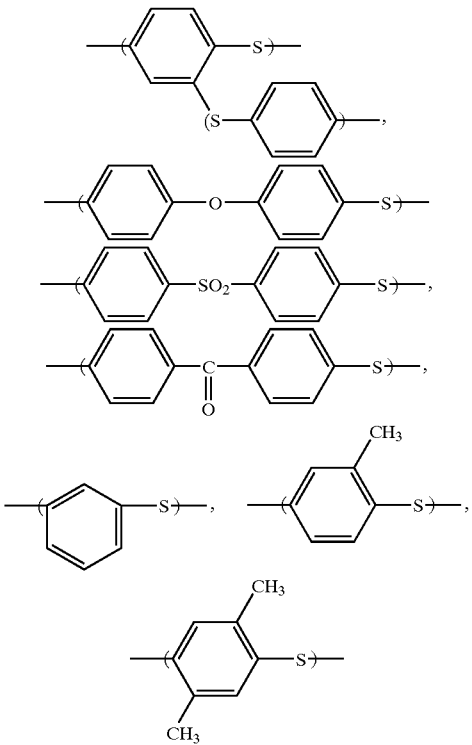

The melt viscosity of the PPS resin for use in the invention is not specifically defined, so far as the resin is melt-kneadable. In general, however, the PPS resin shall have a melt viscosity of from 50 to 20,000 poises, preferably from 100 to 5,000 poises, as measured at 320° C. and at a shear rate of 1,000 sec$^{-1}$.

PPS resins usable in the invention can be produced in any ordinary known manner, for example, by the method of producing polymers having a relatively low molecular weight, as described in Japanese Patent Publication No. 45-3368, or by the method of producing polymers having a relatively high molecular weight, as described in Japanese Patent Publication No. 52-12240 or No. 61-7332. Needless to say, those PPS resins as produced in any of those manners can be processed in various manners, prior to being used in the invention, for example, by heating them in air for crosslinking them and/or increasing their molecular weight; or heating them in an inert gas atmosphere such as nitrogen or under reduced pressure; or washing them with organic solvents, hot water or acidic aqueous solutions; or activating them with functional group-having compounds such as acid anhydrides, amines, isocyanates, or disulfides having functional groups.

One example of heating PPS resins for crosslinking them and/or increasing their molecular weight comprises heating a PPS resin in an oxidizing gas atmosphere such as air or oxygen, or in a mixed gas atmosphere comprising the oxidizing gas and an inert gas such as nitrogen or argon, in a heating chamber at a predetermined temperature until the resulting PPS resin may have the intended melt viscosity. The heating temperature generally falls between 170 and 280° C., preferably between 200 and 270° C., and the heating time generally falls between 0.5 and 100 hours, preferably between 2 and 50 hours. Controlling temperature and time produces the intended viscosity level of the processed PPS resin. As for the heating device, any ordinary hot air driers or rotary or stirrer-combined heaters are suitable. However, preferred are rotary or stirrer-combined heaters for efficient and uniform heat treatment.

One example of heating PPS resins in an inert gas atmosphere such as nitrogen or under reduced pressure comprises heating a PPS resin in an inert gas atmosphere such as nitrogen or under reduced pressure at a temperature of between 150 and 280° C., preferably between 200 and 270° C., for 0.5 to 100 hours, preferably for 2 to 50 hours. As for the heating device, any ordinary hot air driers or rotary or stirrer-combined heaters are suitable. However, preferred are rotary or stirrer-combined heaters for efficient and uniform heat treatment.

PPS resins for use in the invention are preferably de-ionized ones. For the deionization, for example, PPS resins may be washed with acidic aqueous solutions, hot water, or organic solvents. Those washing treatments may be combined, if desired.

One example of washing PPS resins with organic solvents is referred to below. The organic solvent to be used for the washing is not specifically defined, provided that it does not decompose PPS resins. For example, employable is any of nitrogen-containing polar solvents such as N-methylpyrrolidone, dimethylformamide, dimethylacetamide; sulfoxide-type and sulfone-type solvents such as dimethylsulfoxide, dimethylsulfone; ketone-type solvents such as acetone, methyl ethyl ketone, diethyl ketone, acetophenone; ether-type solvents such as dimethyl ether, dipropyl ether, tetrahydrofuran; halogen-containing solvents such as chloroform, methylene chloride, trichloroethylene, dichloroethylene, dichloroethane, tetrachloroethane, chlorobenzene; alcoholic and phenolic solvents such as methanol, ethanol, propanol, butanol, pentanol, ethylene glycol, propylene glycol, phenol, cresol, polyethylene glycol; and aromatic hydrocarbon solvents such as benzene, toluene, xylene. Of those organic solvents, especially preferred are N-methylpyrrolidone, acetone, dimethylformamide and chloroform. The organic solvents can be used in a single or mixed solvent system. To wash PPS resins with such an organic solvent, for example, the resins are dipped in the organic solvent optionally with stirring or heating them. The washing temperature for the treatment is not specifically defined and may be from room temperature to 300° or so. The higher the washing temperature is, the higher is the washing efficiency to be attained. In general, however, the washing temperature may be from room temperature to 150° or so to produce good results. It is desirable to further wash the PPS resins that have been washed with organic solvents, several times with cold water or lukewarm water, thereby removing the remaining organic solvents from the PPS resins.

One example of processing PPS resins with hot water is referred to. Water for the treatment is preferably distilled water or deionized water, with which PPS resins can be favorably processed to have good chemical modifications. For the treatment of PPS resins with hot water, in general, a predetermined amount of the PPS resin to be treated is put into a predetermined amount of water, and heated with stirring under normal or elevated pressure. Regarding the ratio of the PPS resin to water, it is desirable that the amount of water is larger than that of the PPS resin. In general, the bath ratio is so determined that the amount of the PPS resin to be treated in one liter of water is not larger than 200 g.

One example of processing PPS resins with acids is referred to. PPS resins are dipped in acids or acidic aqueous solutions optionally with heating or stirring. Acids to be used for the treatment are not specifically defined, provided that they do not decompose PPS resins. For example, employable is any of aliphatic saturated monocarboxylic acids such as formic acid, acetic acid, propionic acid, butyric acid; halogen-substituted, aliphatic saturated carboxylic acids such as chloroacetic acid, dichloroacetic acid; aliphatic unsaturated monocarboxylic acids such as acrylic acid, crotonic acid; aromatic carboxylic acids such as benzoic acid, salicylic acid; dicarboxylic acids such as oxalic acid, malonic acid, succinic acid, phthalic acid, fumaric acid; and inorganic acidic compounds such as sulfuric acid, phosphoric acid, hydrochloric acid, carbonic acid, silicic acid. Of those, preferred are acetic acid and hydrochloric acid. It is desirable to further wash the acid-processed PPS resins several times with cold water or lukewarm water, thereby removing the remaining acids and salts from the PPS resins. Water to be used for the washing is preferably distilled or deionized water, as not interfering with the favorable chemical modifications of the acid-processed PPS resins.

Preferred is addition of (B) an olefinic copolymer having at least one functional group selected from epoxy groups, acid anhydride groups, carboxyl group and its salts and carboxylate groups, to the thermoplastic resin composition that constitutes the layer (a), as enhancing the interlayer adhesion and the stiffness of the moldings comprising the composition, and enhancing the flexibility of the tubular moldings comprising it. The olefinic copolymer having functional groups shall have at least one functional group selected from epoxy groups, acid anhydride groups, carboxyl group and its salts, and carboxylate groups.

As examples of olefinic polymers having at least one epoxy group, mentioned are olefinic copolymers having any of glycidyl esters, glycidyl ethers and glycidyldiamines in their side chains; and those as prepared by epoxidative oxidation of the double bond(s) of double bond-having olefinic copolymers. Of the epoxy group-having olefinic copolymers, preferred are those as prepared through copolymerization of epoxy group-having monomers. Especially preferred are olefinic copolymers consisting essentially of a-olefins and glycidyl esters of a,b-unsaturated acids.

The a-olefins include, for example, ethylene, propylene, butene-1,4-methylpentene-1, hexene-1, decene-1 and octene-1. Of those, preferred is ethylene. If desired, their mixtures can be used.

The glycidyl esters of a,b-unsaturated acids may be represented by the following general formula, which include, for example, glycidyl acrylate, glycidyl methacrylate and glycidyl ethacrylate. Preferred is glycidyl methacrylate.

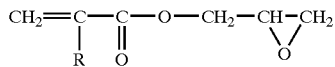

wherein R represents a hydrogen atom or a lower alkyl group.

The olefinic copolymers of that type consisting essentially of a-olefins and glycidyl esters of a,b-unsaturated acids may be any of random, block and graft copolymers of a-olefins and glycidyl esters of a,b-unsaturated acids such as those mentioned above.

In those olefinic copolymers consisting essentially of a-olefins and glycidyl esters of a,b-unsaturated acids, the amount of the copolymerized glycidyl esters is preferably from 0.5 to 40% by weight, more preferably from 3 to 30% by weight, from the viewpoints of the influence of the comonomers on the targeted objects of the invention, and also their influences on the polymerizability of the comonomers and on the gellation, the heat resistance, the fluidity and the strength of the copolymers.

As the olefinic copolymers having at least one epoxy group for use in the invention, also preferred are those comprising components of (1) a-olefins, (2) glycidyl esters of a,b-unsaturated acids, and (3) additional monomers of the following general formula:

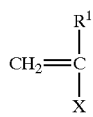

wherein R1 represents a hydrogen atom or a lower alkyl group; X represents a group selected from —COOR$^2$, —CN and aromatic groups; and R$^2$ represents an alkyl group having from 1 to 10 carbon atoms.

For the details of (1) a-olefins and (2) glycidyl esters of a,b-unsaturated acids to be used in producing the olefinic copolymers of that type, referred to are those as mentioned hereinabove for the olefinic copolymer (B).

Examples of the monomers (3) include alkyl esters of a,b-unsaturated carboxylic acids, such as methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, isobutyl methacrylate; acrylonitrile, styrene, a-methylstyrene; and styrene derivatives and acrylonitrile-styrene copolymers in which the aromatic ring is substituted by alkyl group(s). Two or more of those monomers can be used as combined.

The olefinic copolymers of that type may be any of random and/or block and/or graft copolymers of those a-olefins (1), glycidyl esters of a,b-unsaturated acids (2) and monomers (3). For example, the copolymers may be prepared through two or more different types of copolymerization of graft-copolymerizing a random copolymer of a-olefins (1) and glycidyl esters of a,b-unsaturated acids (2) with monomers (3).

The ratio of the comonomers to be copolymerized into the olefinic copolymers, a-olefin (1)/glycidyl ester of a,b-unsaturated acid (2), is preferably from 60/40 to 99/1 in terms of % by weight, from the viewpoints of the influence of the comonomers on the targeted objects of the invention, and also their influences on the polymerizability of the comonomers and on the gellation, the heat resistance, the fluidity and the strength of the copolymers. The ratio of the comonomer (3) to those a-olefin (1) and glycidyl ester of a,b-unsaturated acid (2), (3)/[(1)+(2)], is preferably from 5/95 to 60/40 in term of % by weight.

The polyolefinic copolymers having any of carboxyl group and its salts, carboxylate groups and acid anhydride groups, which are preferably used in the invention, include, for example, those as prepared by copolymerizing polyolefinic resins of, for example, polyethylenes, polypropylenes, polystyrenes, ethylene-propylene copolymers, ethylene-butene copolymers, polybutene, ethylene-propylene-diene copolymers, styrene-butadiene copolymers, styrene-butadiene-styrene (SBS) block copolymers, styrene-isoprene-styrene (SIS) copolymers, polybutadienes, butadiene-acrylonitrile copolymers, polyisoprenes, butene-isoprene copolymers, styrene-ethylene-butylene-styrene (SEBS) block copolymers and styrene-ethylene-propylene-styrene (SEPS) block copolymers, with comonomers of, for example, maleic anhydride, succinic anhydride, fumaric anhydride, acrylic acid, methacrylic acid, vinyl acetate, and their salts such as Na, Zn, K, Ca and Mg salts, and methyl acrylate, methyl methacrylate, ethyl acrylate, ethyl methacrylate, propyl acrylate, propyl methacrylate, butyl acrylate and butyl methacrylate. As examples of those copolymers, concretely mentioned are olefin-(meth)acrylate copolymers such as ethylene-methyl acrylate copolymers, ethylene-ethyl acrylate copolymers, ethylene-n-propyl acrylate copolymers, ethylene isopropyl acrylate copolymers, ethylene-n-butyl acrylate copolymers, ethylene-t-butyl acrylate copolymers, ethylene-isobutyl acrylate copolymers, ethylene-methyl methacrylate copolymers, ethylene-ethyl methacrylate copolymers, ethylene-n-propyl methacrylate copolymers, ethylene-isopropyl methacrylate copolymers, ethylene-n-butyl methacrylate copolymers, ethylene-t-butyl methacrylate copolymers, ethylene-isobutyl methacrylate copolymers; (meth)acrylate-acrylonitrile copolymers such as methyl acrylate-acrylonitrile copolymers, methyl methacrylate-acrylonitrile copolymers, propyl acrylate-acrylonitrile copolymers, propyl methacrylate-acrylonitrile copolymers, butyl acrylate-acrylonitrile copolymers, butyl methacrylate-acrylonitrile copolymers; ethylene-(meth) acrylate copolymers and their metal salts such as Na, Zn, K, Ca and Mg salts; ethylene-maleic anhydride copolymers, ethylene-butene-maleic anhydride copolymers, ethylene-butene-maleic anhydride copolymers, ethylene-inaleic anhydride copolymers, propylene-maleic anhydride copolymers, and also maleic anhydride-modified SBS, SIS, SEBS, SEPS, and ethylene-ethyl acrylate copolymers.

The copolymerization mode for those olefinic copolymers is not specifically defined, and the copolymers may be any of random copolymers, graft copolymers and block copolymers.

The amount of the olefinic copolymer (B) having at least one functional group selected from epoxy groups, acid anhydride groups, carboxyl group and its salts and carboxylate groups, which may be in the thermoplastic resin composition, may be from 1 to 200 parts by weight, preferably from 1 to 100 parts by weight, more preferably from 3 to 50 parts by weight, relative to 100 parts by weight of the PPS resin (A) to be in the composition, from the viewpoints of the gas permeation resistance, the flexibility and the impact strength of the moldings comprising the composition and of the tube moldability of the composition.

Two or more olefinic copolymers (B) may be in the composition. A combination of an olefinic copolymer having an epoxy group (B1) and an olefinic copolymer having an acid anhydride (B2) is preferably incorporated into the composition to enhance the stiffness and the interlayer adhesion of the moldings comprising the composition. For the details of the olefinic copolymer having the epoxy group (B1) and the olefinic copolymer having the acid anhydride group (B2), referred to are the examples of those copolymers mentioned hereinabove.

For the combination of those two, olefinic copolymers having functional groups, the ratio of (B1) to (B2), (B1)/(B2), is preferably from 1/99 to 99/1, more preferably from 5/95 to 50/50, in terms of % by weight, with the total of (B1) and (B2) being 100% by weight.

Preferably, the thermoplastic resin composition may further contain an elastomer (C) having no epoxy groups, acid anhydride groups, carboxyl group and its salts and carboxylate groups, especially along with the olefinic copolymer having functional groups (B). The composition containing the elastomer (C) is preferred, as having good moldability to produce hollow moldings with good inner surface smoothness and high stiffness.

The elastomer (C) includes, for example, polyolefinic elastomers, dienic elastomers, silicone rubbers, fluorine rubbers, urethane rubbers and other various thermoplastic elastomers. As examples of the polyolefinic elastomers, mentioned are ethylene-propylene copolymers, ethylene-butene copolymers, polybutenes, and ethylene-propylene-diene copolymers. As examples of the dienic elastomers, mentioned are styrene-butadiene copolymers, polybutadienes, butadiene-acrylonitrile copolymers, polyisoprenes, butene-isoprene copolymers, SBS, SIS, SEBS, and SEPS.

Of those, especially preferred are ethylene-propylene copolymers, ethylene-butene copolymers, and ethylene-propylene-diene copolymers.

Two or more those elastomers (C) can be in the resin composition, as combined.

The preferred amount of the elastomer (C) that may be in the resin composition may be from 5 to 200 parts by weight, preferably from 5 to 100 parts by weight, more preferably from 10 to 80 parts by weight, relative to 100 parts by weight of the PPS resin (A) to be in the composition, from the viewpoints of the alcohol-gasoline permeation resistance, the flexibility and the impact resistance of the moldings comprising the composition and of the tube moldability of the composition.

Where the elastomer (C) is added to the resin composition along with the functional group-having olefinic copolymer (B), the total amount of the elastomer (C) and the copolymer (B) is preferably not larger than 200 parts by weight, more preferably not larger than 100 parts by weight, even more preferably not larger than 70 parts by weight, relative to 100 parts by weight of the PPS resin (A) to be in the composition, from the viewpoint of the alcohol-gasoline permeation resistance of the moldings comprising the composition.

Also preferred is addition of an alkoxysilane (E) having at least one functional group selected from epoxy groups, amino groups, isocyanato groups, hydroxyl groups, mercapto groups and ureido groups, to the thermoplastic resin composition, as enhancing the mechanical strength, the stiffness and the interlayer adhesion of the moldings comprising the composition and also enhancing the moldability of the composition into hollow moldings. As examples of the alkoxysilane (E), mentioned are alkoxgysilanes having epoxy groups such as g-glycidoxypropyltrimethoxysilane, g-glycidoxypropyltriethoxysilane, b-(3,4-epoxycyclohexyl) ethyltrimethoxysilane; alkoxysilanes having mercapto groups such as g-mercaptopropyltrimethoxysilane, g-mercaptopropyltriethoxysilane; alkoxysilanes having ureido groups such as g-ureidopropyltriethoxysilane, g-ureidopropyltrimethoxysilane, g-(2-ureidoethyl) aminopropyltrimethoxysilane; alkoxysilanes having isocyanato groups such as g-isocyanatopropyltriethoxysilane, g-isocyanatopropyltrimethoxysilane, g-isocyanatopropylmethyldimethoxysilane, g-isocyanatopropylmethyldiethoxysilane, g-isocyanatopropylethyldimethoxysilane, g-isocyanatopropylethyldiethoxysilane, g-isocyanatopropyltrichlorosilane; alkoxysilanes having amino groups such as g-(2-aminoethyl) aminopropylmethyldimethoxysilane, g-(2-aminoethyl) aminopropyltrimethoxysilane, g-aminopropyltrimethoxysilane; and alkoxysilanes having hyroxyl groups such as g-hydroxypropyltrimethoxysilane, g-hydroxypropyltriethoxysilane. Of those, preferred are alkoxysilanes having epoxy groups such as g-glycidoxypropyltrimethoxysilane, g-glycidoxypropyltriethoxysilane, b-(3,4-epoxycyclohexyl) ethyltrimethoxysilane; alkoxysilanes having ureido groups such as g-ureido propyltriethoxysilane, g-ureidopropyltrimethoxysilane, g-(2-ureidoethyl) aminopropyltrimethoxysilane; alkoxysilanes having amino groups such as g-(2-aminoethyl) aminopropylmethyldimethoxysilane, g-(2-aminoethyl) aminopropyltrimethoxysilane, g-aminopropyltrimethoxysilane; and alkoxysilanes having isocyanato groups such as g-isocyanatopropyltriethoxysilane, g-isocyanatopropyltrimethoxysilane, g-isocyanatopropylmethyldimethoxysilane, g-isocyanatopropylmethyldiethoxysilane, g-isocyanatopropylethyldimethoxysilane, g-isocyanatopropylethyldiethoxysilane, g-isocyanatopropyltrichlorosilane.

The amount of the alkoxysilane compound (E) that may be in the resin composition may be from 0.05 to 5 parts by weight, preferably from 0.1 to 3 parts by weight, relative to 100 parts by weight of the PPS resin (A) to be in the composition.

As examples of the thermoplastic resin (D) consisting essentially of repeating units as bonded together via at least one bonding mode selected from amido bonds, ester bonds and urethane bonds, mentioned are polyamide resins, saturated polyester resins, and thermoplastic polyurethane resins. For the details of those resins, referred to are the same as those mentioned hereinabove for the layer (b), and the detailed description of those resins is omitted herein.

The amount of the thermoplastic resin (D) that may be in the resin composition may be from 5 to 200 parts by weight, preferably from 10 to 100 parts by weight, more preferably from 10 to 70 parts by weight, relative to 100 parts by weight of the PPS resin (A) to be in the composition, from the viewpoints of the alcohol-gasoline permeation resistance, the flexibility, the impact strength and the interlayer adhesion of the moldings comprising the composition and of the tube moldability of the composition.

The addition of one or more thermoplastic resins (D) to the PPS resin (A) to be in the PPS resin composition that is to constitute the layer (a) is especially effective in increasing the strength of interlayer adhesion of the layer (a) to the adjacent layers. In this case, where the thermoplastic resin (D) to be in the layer (a) of the PPS resin composition is a polyamide resin, it is preferred that the layers to be adjacent to the layer (a) are made from polyamide resins in order to further enhance the strength of interlayer adhesion between those layers. Where the layers adjacent to the layer (a) are made from polyamide resins and where the thermoplastic resin (D) existing in the PPS resin composition for the layer (a) is nylon 6, it is more preferred that the layers adjacent to the layer (a) are of nylon 6 from the viewpoint of the interlayer adhesion between those layers. However, the layers adjacent to the layer (a) may also be of any other polyamide resins such as nylon 66 and nylon 11 to attain the intended interlayer adhesion.

Now described in detail hereinunder is the electroconductive, thermoplastic resin composition for the layer (c), which comprises an electroconductive filler and/or an electroconductive polymer.

The thermoplastic resin (F) to be in the composition includes, for example, PPS resins such as those mentioned hereinabove, and saturated polyester resins, polysulfone resins, tetrafluoroethylene resins, polyether-imide resins, polyamidimide resins, polyamide resins, polyimide resins, polyether-sulfone resins, polyether-ketone resins, polythioether-ketone resins, polyether-ether-ketone resins, thermoplastic polyurethane resins, polyolefin resins, ABS resins, polyamide elastomers, and polyester elastomers.

Of those, preferred are one or more selected from polyphenylene sulfide resins, polyamide resins, and thermoplastic polyester resins. For the details of those thermoplastic resins, referred to are those mentioned hereinabove for the layers (a) and (b), and the detailed description of those resins is omitted herein.

In order to further enhance the interlayer adhesion of the moldings of the invention, it is preferable that the thermoplastic resin (F) is similar in kind to at least one resin that constitutes the layers to be adjacent to the layer (c).

Addition of a thermoplastic resin that comprises an olefinic copolymer (B) having at least one functional group selected from epoxy groups, acid anhydride groups, carboxyl group and its salts and carboxylate groups to the resin composition for the layer (c) is preferred in order to further enhance the stiffness and the interlayer adhesion of the moldings comprising the composition. For the details of the thermoplastic resin that comprises the functional group-having olefinic copolymer (B), referred to are those mentioned hereinabove for the layer (a), and the detailed description of the resin is omitted herein.

Also preferred is addition of an elastomer (C) having no epoxy groups, acid anhydride groups, carboxyl group and its salts and carboxylate groups to the resin composition for the layer (c), in order to further improve the balance between the stiffness of the moldings comprising the composition and the fluidity of the composition. For the details of the elastomer (C) to be in the layer (c), referred to are those mentioned hereinabove for the layer (a), and the detailed description of the elastomer (C) is omitted herein.

The compositional proportions of the constituent components that constitute the resin moiety in the electroconductive, thermoplastic resin composition for the layer (c), except for the electroconductive filler and the electroconductive polymer to be in the composition, are preferably such that the amount of the thermoplastic resin (F) is from 40 to 98% by weight, the amount of the olefinic copolymer (B) having at least one functional group selected from epoxy groups, acid anhydride groups, carboxyl group and its salts and carboxylate groups is from 2 to 60% by weight, and the amount of the elastomer (C) having no epoxy groups, acid anhydride groups, carboxyl group and its salt and carboxylate groups is from 0 to 58% by weight, or such that the amount of the olefinic copolymer having functional groups (B) is from 1 to 100 parts by weight, more preferably from 1 to 50 parts by weight, even more preferably from 1 to 20 parts by weight, relative to 100 parts by weight of the thermoplastic resin (F), from the viewpoints of the stiffness and the surface smoothness of the moldings comprising the composition and of the extrusion moldability of the composition.

Two or more, olefinic copolymers having functional groups (B) may be in the composition. A combination of at least two, olefinic copolymers having functional groups, an olefinic copolymer having epoxy groups (B1) and an olefinic copolymer having acid anhydride group (B2) is preferably incorporated into the composition to enhance the stiffness of the moldings comprising the composition. For the combination of those two olefinic copolymers having functional groups, the ratio of (B1) to (B2), (B1)/(B2), is preferably from 1/99 to 99/1, more preferably from 30/70 to 70/30, in terms of % by weight, with the total of (B1) and (B2) being 100% by weight.

Now described in detail hereinunder are the electroconductive filler and the electroconductive polymer of (G). The electroconductive filler for use in the invention is not specifically defined, and any and every electroconductive filler that is generally used for making resins electroconductive is usable in the invention, including, for example, metal powders, metal flakes, metal ribbons, metal fibers, metal oxides, inorganic fillers coated with electroconductive substances, carbon powders, graphites, carbon fibers, and carbon flakes.

As examples of the metals of those metal powders, metal flakes and metal ribbons, mentioned are silver, nickel, copper, zinc, aluminium, stainless steel, iron, brass, chromium and tin.

As examples of the metals of the metal fibers, mentioned are iron, copper, stainless steel, aluminium and brass.

Those metal powders, metal flakes, metal ribbons and metal fibers may be surface-treated with, for example, titanate, aluminium or silane surface-treating agents.

Examples of the metal oxides are $SnO_2$ (doped with antimony), $In_2O_3$ (doped with antimony), and ZnO (doped with aluminium), which may be surface-treated with, for example, titanate, aluminium or silane surface-treating agents.

Examples of the electroconductive substances for the inorganic fillers coated with them are aluminium, nickel, silver, carbon, $SnO_2$ (doped with antimony), and $In_2O_3$ (doped with antimony). Examples of the inorganic fillers to be coated with those substances are mica, glass beads, glass fibers, carbon fibers, potassium titanate whiskers, barium sulfate, zinc oxide, titanium oxide, aluminium borate whiskers, zinc oxide whiskers, titanium oxide whiskers, and silicon carbide whiskers. For coating the inorganic fillers with those electroconductive substances, for example, employable is any of vacuum vapor deposition, sputtering, chemical plating, and baking. The coated inorganic fillers may be surface-treated with, for example, titanate, aluminium or silane surface-treating agents.

Depending on the starting materials and the production methods used for producing them, carbon powders are grouped into different types of acetylene black, gas black, oil black, naphthalene black, thermal black, furnace black, lump black, channel black, roll black, and disc black. The carbon powders usable in the invention are not specifically defined with respect to the starting materials and the production methods for producing them, but preferred are acetylene black and furnace black. Various types of carbon powders are produced, having different characteristics of grain size, surface area, DBP absorption and ash content. The carbon powders usable in the invention are not specifically defined with respect to such their characteristics. However, from the viewpoint of the balance between their mechanical strength and electroconductivity, the carbon powders for use in the invention are preferably such that their mean grain size is not larger than 500 nm, preferably from 5 to 100 nm, more preferably from 10 to 70 nm; their specific surface area (as measured by a BET method) is not smaller than 10 $m^2/g$, preferably not smaller than 30 $m^2/g$, more preferably not smaller than 500 $m^2/g$, even more preferably not smaller than 800 $m^2/g$; their DBP absorption is not smaller than 50 ml/100 g, preferably not smaller than 100 ml/100 g; and their ash content is not larger than 0.5%, preferably not larger than 0.3%.

The carbon powders for use in the invention may be surface-treated with, for example, titanate, aluminium or silane surface-treating agents. In order to improve their melt-kneadability, the carbon powders may be granulated.

The innermost or outermost layer of the hollow moldings of the invention is often required to have good surface smoothness. From this viewpoint, it is desirable that the electroconductive filler to be used in the invention is not a fibrous one having a high aspect ratio, but a powdery, granular, tabular or flaky one or a fibrous one having a ratio, length/diameter, of not larger than 200 when existing in the resin composition.

Examples of the electroconductive polymer for use in the invention are polyaniline, polypyrrole, polyacetylene, poly (paraphenylene), polythiophene, and polyphenylene-vinylene.

Two or more those electroconductive fillers and/or electroconductive polymers can be in the resin composition. Of those electroconductive fillers and electroconductive polymers, especially preferred is carbon black, which has a high mechanical strength and is inexpensive.

The amount of the electroconductive filler and/or the electroconductive polymer to be in the resin composition varies, depending on their type, and should not be defined unconditionally. However, from the viewpoint of the balance between their electroconductivity, fluidity and mechanical strength, their amount may be from 1 to 100 parts by weight, preferably from 1 to 50 parts by weight, relative to 100 parts by weight of the resin composition.

In order to ensure its satisfactory antistatic ability, it is desirable that the electroconductive resin composition has a volume resistivity of not larger than $10^{10}$·cm. The electroconductive filler and the electroconductive polymer to be in the composition often lower the mechanical strength and the fluidity of the composition. Therefore, it is desirable that the amount of the electroconductive filler and the electroconductive polymer to be in the composition is as small as possible, so far as the electroconductive level of the composition is an intended one. The intended electroconductive level of the composition varies, depending on the use of the composition, but may be generally from larger than 100·cm up to $10^{10}$·cm in terms of the volume resistivity of the composition.

In particular, where an electroconductive PPS resin composition is used to form the electroconductive layer of the moldings of the invention, the composition is preferably as follows. The electroconductive PPS resin composition that is suitable for the electroconductive layer of the hollow moldings of the invention comprises (A) a polyphenylene sulfide resin, (G) an electroconductive filler and/or an electroconductive polymer, and (B) an olefinic copolymer having at least one functional group selected from epoxy groups, acid anhydride groups, carboxyl group and its salts and carboxylate groups, in which the amount of the olefinic copolymer having functional groups (B) is from 1 to 200 parts by weight relative to 100 parts by weight of the polyphenylene sulfide resin (A).

For the details of the PPS resin (A) to be in the electroconductive resin composition of that type, referred to are those mentioned hereinabove, and the detailed description of the PPS resin (A) is omitted herein.

For the details of the electroconductive filler and the electroconductive polymer (G) to be in the composition, also referred to are those mentioned hereinabove, and the detailed description of those filler and polymer (G) is omitted herein.

Addition to the resin composition of an olefinic copolymer (B) having at least one functional group selected from epoxy groups, acid anhydride groups, carboxyl group and its salts and carboxylate groups is preferred, in order to ensure good interlayer adhesion and high stiffness of the moldings comprising the composition and to ensure good flexibility of the tubular moldings comprising it.

For the details of the polymers (B), referred to are those mentioned hereinabove, and the detailed description of the polymers (B) is omitted herein.

The amount of the olefinic copolymer (B) having at least one functional group selected from epoxy groups, acid anhydride groups, carboxyl group and its salts and carboxylate groups to be in the electroconductive PPS resin composition may be from 1 to 200 parts by weight, preferably from 1 to 100 parts by weight, more preferably from 3 to 50 parts by weight, relative to 100 parts by weight of the PPS resin (A), from the viewpoints of the gas permeation resistance, the flexibility and the impact resistance of the moldings comprising the composition and of the moldability of the composition into tubes.

Two or more such olefinic copolymer (B) having at least one functional group selected from epoxy groups, acid anhydride groups, carboxyl group and its salts and carboxylate groups may be in the composition, as combined. Especially preferred is a combination of (B1) an olefinic copolymer having epoxy groups and (B2) an olefinic copolymer having acid anhydride groups, as ensuring high stiffness of the moldings comprising the composition. For the details of the epoxy group-having olefinic copolymer (B1) and the acid anhydride group-having olefinic copolymer (B2), referred to are those mentioned hereinabove.

Where those two olefinic copolymers having functional groups (B1) and (B2) are in the composition, the ratio of (B1) to (B2), (B1)/(B2), is preferably from 1/99 to 99/1, more preferably from 5/95 to 50/50, in terms of % by weight, with the total of (B1) and (B2) being 100% by weight.

Preferably, the resin composition may further contain an elastomer (C) having no epoxy groups, acid anhydride groups, carboxyl group and its salts and carboxylate groups, especially along with the functional group-having olefinic copolymer (B). The composition containing the elastomer (C) along with the olefinic copolymer having functional groups (B) is preferred, as having good moldability to produce tubular or hollow moldings with good surface smoothness and high mechanical strength. For the details of the elastomer (C), referred to are those mentioned hereinabove, and the detailed description of the elastomer (C) is omitted herein.

The preferred amount of the elastomer (C) that may be in the resin composition may be from 5 to 200 parts by weight, preferably from 5 to 100 parts by weight, more preferably from 10 to 80 parts by weight, relative to 100 parts by weight of the PPS resin (A) to be in the composition, from the viewpoints of the gasoline permeation resistance, the flexibility and the impact resistance of the moldings comprising the composition and of the tube moldability of the composition.

Where the elastomer (C) is added to the resin composition along with the functional group-having olefinic copolymer (B), the total amount of the elastomer (C) and the resin (B) is preferably not larger than 200 parts by weight, more preferably not larger than 100 parts by weight, even more preferably not larger than 70 parts by weight, relative to 100 parts by weight of the PPS resin (A) to be in the composition, from the viewpoint of the gasoline permeation resistance of the moldings comprising the composition.

Also preferred is addition of an alkoxysilane (E) to the resin composition. Preferably, the alkoxysilane (E) has at least one functional group selected from epoxy groups, amino groups, isocyanato groups, hydroxyl groups, mercapto groups and ureido groups. The addition of such an alkoxysilane (E) to the resin composition is effective in enhancing the mechanical strength, the stiffness and the interlayer adhesion of the moldings comprising the composition and also enhancing the moldability of the composition into hollow moldings. As examples of the alkoxysilane (E), mentioned are alkoxysilanes having epoxy groups such as g-glycidoxypropyltrimethoxysilane, g-glycidoxypropyltriethoxysilane, b-(3,4-epoxycyclohexyl) ethyltrimethoxysilane; mercapto group-having alkoxysilanes such as g-mercaptopropyltrimethoxysilane, g-mercaptopropyltriethoxysilane; alkoxysilanes having ureido groups such as g-ureidopropyltriethoxysilane, g-ureidopropyltrimethoxysilane, g-(2-ureidoethyl) aminopropyltrimethoxysilane; alkoxysilanes having isocyanato groups such as g-isocyanatopropyltriethoxysilane, g-isocyanatopropyltrimethoxysilane, g-isocyanatopropylmethyldimethoxysilane, g-isocyanatopropylmethyldiethoxysilane, g-isocyanatopropylethyldimethoxysilane, g-isocyanatopropylethyldiethoxysilane, g-isocyanatopropyltrichlorosilane; alkoxysilanes having amino groups such as g-(2-aminoethyl)aminopropyl methyl dimethoxysilane, g-(2-aminoethyl) aminopropyltrimethoxysilane, g-aminopropyltrimethoxysilane; and alkoxysilanes having hydroxyl groups such as g-hydroxypropyltrimethoxysilane, g-hydroxypropyltriethoxysilane. Of those, preferred are alkoxysilanes having epoxy groups such as g-glycidoxypropyltrimethoxysilane, g-glycidoxypropyltriethoxysilane, b-(3,4-epoxycyclohexyl) ethyltrimethoxysilane; alkoxysilanes having ureido groups such as g-ureidopropyltriethoxysilane, g-ureidopropyltrimethoxysilane, g-(2-ureidoethyl) aminopropyltrimethoxysilane; alkoxysilanes having amino groups such as g-(2-aminoethyl) aminopropylmethyldimethoxysilane, g-(2-aminoethyl) aminopropyltrimethoxysilane, g-aminopropyltrimethoxysilane; and alkoxysilanes having isocyanato groups such as g-isocyanatopropyltriethoxysilane, g-isocyanatopropyltrimethoxysilane, g-isocyanatopropylmethyldimethoxysilane, g-isocyanatopropylmethyldiethoxysilane, g-isocyanatopropylethyldimethoxysilane, g-isocyanatopropylethyldiethoxysilane, g-isocyanatopropyltrichlorosilane.

The amount of the alkoxysilane compound (E) that may be in the resin composition may be from 0.05 to 5 parts by weight, preferably from 0.1 to 3 parts by weight, relative to 100 parts by weight of the PPS resin (A) to be in the composition.

As examples of the thermoplastic resin (D) consisting essentially of repeating units as bonded together via at least one bonding mode selected from amido bonds, ester bonds and urethane bonds, mentioned are polyamide resins, saturated polyester resins, and thermoplastic polyurethane resins. For the details of those resins, referred to are those mentioned hereinabove, and the detailed description of those resins is omitted herein.

The amount of the thermoplastic resin (D) that may be in the resin composition may be from 5 to 200 parts by weight, preferably from 10 to 100 parts by weight, more preferably from 10 to 70 parts by weight, relative to 100 parts by weight of the PPS resin (A) to be in the composition, from the viewpoints of the gasoline permeation resistance, the flexibility, the interlayer adhesion and the impact strength of the moldings comprising the composition and of the tube moldability of the composition.

Where the thermoplastic resin (D) to be in the layer of the electroconductive PPS resin composition is a polyamide resin, it is preferred that the thermoplastic resin except PPS resins which is to constitute the layer (b) is also a polyamide resin in order to further enhance the strength of interlayer adhesion between those layers. In particular, where the polyamide resin for the thermoplastic resin (D) that is to be in the electroconductive PPS resin composition is nylon 6, it is more preferred that the thermoplastic resin except PPS resins which is to constitute the layer (b) is also nylon 6 in order to much more enhance the strength of interlayer adhesion between those layers. However, the thermoplastic resin that is to constitute the layer (b) may also be any other polyamide resin such as nylon 66 and nylon 11 to attain the intended interlayer adhesion.

The electroconductive resin composition of the invention is preferably a thermoplastic resin composition capable of being molded into moldings with good surface smoothness. Concretely, the preferred thermoplastic resin composition is characterized in that, when it is put into a melt indexer (315.5° C., residence time of 5 minutes, load of 5 kg, orifice diameter of 0.0825 inches, orifice length of 0.315 inches) to obtain a gut and when the gut is projected through a projector, the number of projections having a height of not shorter than 25 m as seen in the surface of the gut is not more than 5, preferably not more than 2, more preferably not more than 1, per cm of the gut.

In order that the resin composition ensures such good surface smoothness of its moldings, it is effective to use a thermoplastic resin having a relatively high molecular weight as the resin (F).

In many cases, the thermoplastic resin (F) is available as its pellets, which may be ground into granules having a weight-average grain size of not larger than 2 mm, or even into powders. Melt-kneading the resulting granules or powders of the resin (F) with an electroconductive filler (G) is also effective in improving the surface smoothness of the moldings of the composition. If desired, the granules or powders of the resin (F) having a weight-average grain size of not larger than 2 mm may be combined with pellets of the resin (F).

Where a thermoplastic resin (F), an electroconductive filler (G) and an olefinic copolymer (B) having at least one functional group selected from epoxy groups, acid anhydride groups, carboxyl group and its salts and carboxylate groups are used to prepare the resin composition, effectively employed is a method that comprises melt-kneading the thermoplastic resin (F) and the electroconductive filler (G) followed by further melt-kneading the resulting mixture with the olefinic copolymer having functional groups (B). The composition as prepared by the multi-stage melt-kneading method can be molded into moldings with much improved surface smoothness.

In carrying out the multi-stage melt-kneading method that comprises melt-kneading the thermoplastic resin (F) and the electroconductive filler (G) followed by further melt-kneading the resulting mixture with the olefinic copolymer having functional groups (B), for example, the components to be melt-kneaded in the first stage may be fed into the kneader through a main hopper while those to be added to and melt-kneaded with the resulting mixture in the second stage may be fed thereinto through a side feeder.

The electroconductive resin composition preferably has a melt viscosity of from 1,000 to 20,000 poises, more preferably from 1,000 to 10,000 poises, when measured as 270 C and at a shear rate of 1000/sec. The melt viscosity falling within the range is relatively too high for the composition comprising, as the thermoplastic resin (F), a polyamide resin that comprises constitutional amido units each having from 8 to 15 carbon atoms per one amido group, and the composition comprising such a polyamide resin and having such a high melt viscosity is not preferred for ordinary hollow moldings.

However, in one aspect of the invention that provides a multilayered hollow molding as prepared through co-extrusion of at least two resin compositions, (d) an electroconductive, thermoplastic resin composition capable of being molded into moldings with good surface smoothness and (e-1) a resin composition comprising a polyphenylene sulfide resin in an amount of at least not smaller than 30% by weight, the resin composition (d) is desired to have such a high melt viscosity as falling within the range defined as above. This is because, in the co-extrusion to prepare the hollow molding, the thermoplastic resin composition (d) is exposed to a high temperature of being at lowest 250° C. or higher in order to well laminate the layer of the polyphenylene sulfide resin composition (e-1) and the layer of the electroconductive thermoplastic resin composition (d). At such a high temperature of not lower than 250° C., the resin composition (d) exhibits good moldability.

The thermoplastic resin compositions for the layers that constitute the multilayered moldings of the invention may contain non-electroconductive, fibrous and/or non-fibrous fillers, depending on the object and the use of the moldings and without overstepping the scope of the invention. As examples of the fibrous fillers employable herein, mentioned are glass fibers, milled glass fibers, carbon fibers, potassium titanate whiskers, zinc oxide whiskers, aluminium borate whiskers, aramide fibers, alumina fibers, silicon carbide fibers, ceramic fibers, asbestos fibers, gypsum fibers, and metal fibers. As examples of the non-fibrous fibers also employable herein, mentioned are silicates such as wollastonite, zeolite, sericite, kaolin, mica, clay, pyrophyllite, bentonite, asbestos, talc, alumina silicate; metallic compounds such as alumina, silicon oxide, magnesium oxide, zirconium oxide, titanium oxide; carbonates such as calcium carbonate, magnesium carbonate, dolomite; sulfates such as calcium sulfate, barium sulfate; hydroxides such as magnesium hydroxide, calcium hydroxide, aluminium hydroxide; and glass beads, ceramic beads, boron nitride, silicon carbide, and silica. These fillers may be hollow, and two or more of these fillers may be combined. These fibrous and/or non-fibrous fillers for use in the invention are preferably pre-treated with coupling agents of, for example, isocyanate compounds, organic silane compounds, organic titanate compounds, organic borane compounds or epoxy compounds to thereby enhance their mechanical strength.

The amount of the fibrous and/or non-fibrous fillers, if added to the thermoplastic resin compositions, may be generally from 5 to 50% by weight relative to the total weight of the composition.

In addition, the thermoplastic resin compositions for the layers that constitute the multilayered moldings of the invention may further contain any ordinary additives, which include, for example, plasticizers such as polyalkylene oxide oligomers, thioether compounds, ester compounds, organic phosphorus compounds; nucleating agents such as talc, kaolin, organic phosphorus compounds, polyether-etherketones; coloration inhibitors such as hypophosphites; and antioxidants, thermal stabilizers, lubricants, ultraviolet inhibitors, colorants, flame retardants, and foaming agents.

Methods for producing the resin compositions of the invention are not specifically defined. In one typical example for the production, a mixture of the constituent components is fed into any known melt mixer, such as a single-screw or double-screw extruder, a Bumbury mixer, a kneader or a mixing roll, and kneaded therein at a temperature that is higher than the melting point of the mixture by 10 to 50° C. The order in mixing the constituent components is not also specifically defined. For example, employable is any of a method comprising pre-mixing the constituent components all at once followed by melt-kneading the resulting mixture in the manner as mentioned above; a method comprising pre-mixing a part of the constituent components, then melt-kneading the resulting mixture in the manner as mentioned above, and thereafter adding the remaining part of the constituent components to the resulting melt followed by further melt-kneading them; and a method comprising pre-mixing a part of the constituent components followed by melt-kneading the resulting mixture in a single-screw or double-screw extruder into which the remaining part of the constituent components is fed through a side feeder. Minor additives, if desired, may be added to the pelletized compositions as prepared through kneading of the constituent components in the manner as mentioned above followed by pelletization of the resulting melt, and the pelletized compositions thus containing such minor additives may then be molded.

The electroconductive resin compositions of the invention have good moldability to give tubular or hollow moldings, and are especially suitable for tubular or hollow moldings with good gasoline permeation resistance, flexibility, impact resistance, and interlayer adhesion. However, the applications of the compositions are not limited to only such tubular or hollow moldings. Needless to say, the compositions can be subjected to injection molding and any other molding modes.

As one example of producing the multilayered hollow moldings of the invention, mentioned hereinunder is a method for producing multilayered tubular moldings, by which, however, the invention should not be restricted. Resin melts as extruded out through a plurality of extruders, the number of which corresponds to the number of the layers to be laminated to give the intended, multilayered tubes or to the number of the constituent components that shall constitutes the tubes, are introduced into one, multilayered tubular die, and the melts are laminated together still in the die or immediately after having been extruded out through the die to give the intended, multilayered tubes. Alternatively, single-layered tubes are once prepared, and their inner or outer surfaces may be laminated with other layers to give the intended, multilayered tubes.

To produce multilayered tubes that are composed of three or more layers, the number of the extruders to be used is increased, and those plural extruders are connected with a co-extrusion die, through which a multilayered parison is extruded out.

The arrangement of the layers that constitute the multilayered hollow moldings of the invention is not specifically defined. However, it is desirable that the layer of the electroconductive resin composition is the innermost one for the purpose of making the layer fully exhibit its electroconductive effect.

It is desirable that the multilayered hollow moldings of the invention have a total thickness falling between 0.2 mm and 3 mm in order that they have good hot water resistance and chemical resistance and also good flexibility as tubes. For the moldings that have the total thickness falling within the defined range, the thickness of the electroconductive layer in these is preferably from 3% to 50%, more preferably from 3% to 20% of their total thickness.

Preferred embodiments of the layer constitution for the electroconductive, multilayered hollow moldings of the invention are mentioned below, which, however, are not limitative.

Outer layer (b)/inner, electroconductive PPS layer (c)

Outer layer (b)/interlayer (a)/inner, electroconductive PPS layer (c)

Outer layer (b)/interlayer (a)/inner, electroconductive layer (c) not containing PPS Outer layer (b)/electroconductive PPS interlayer (c)/inner, non-electroconductive PPS layer Outer layer (b)/electroconductive PPS interlayer (c)/inner layer (a)

Outer layer (b)/inner, electroconductive layer (c) not containing PPS

In these embodiments, the layer (a) is a layer comprising an polyphenylene sulfide resin composition; the layer (b) is a thermoplastic resin composition comprising a thermoplastic resin other than a polyphenylene sulfide resin; and the layer (c) is an electroconductive, thermoplastic resin composition that containing an electroconductive filler and/or an electroconductive polymer.

The multilayered hollow moldings of the invention have good heat resistance, hot water resistance, chemical resistance and abrasion resistance, while having good outward appearance. In addition, they have good interlayer adhesion between the thermoplastic resin layer and the adjacent resin layers constituting them, and have good antistatic properties. Therefore, the multilayered hollow moldings of the invention, which may be blow moldings of, for example, bottles, tanks and ducts, or may be extrusion moldings of, for example, pipes and tubes, are effectively used as car parts, and electric and electronic parts, and even in various appliances for chemicals. In particular, the multilayered hollow moldings of the invention are favorably used as fuel tubes, especially those in internal engines for cars, with fully exhibiting their excellent characteristics mentioned above.

DISCLOSURE OF PREFERRED EMBODIMENTS OF THE INVENTION

Now, the invention is described in more detail hereinunder with reference to the following Examples, which, however, are not intended to restrict the scope of the invention.

The volume resistivity, the interlayer adhesion strength, the alcohol-gasoline permeation resistance, the mechanical strength, the inner surface smoothness, the melt viscosity, the kink resistance, and the low-temperature stiffness of tubes, which are referred to in the following Examples, were determined according to the methods mentioned below.

Volume Resistivity:

Pellets of an electroconductive resin composition to be tested were molded through injection molding at a resin temperature of being higher than the melting point of the resin by 40 to 50° C. and at a mold temperature falling between 70 and 150° C., to give disc samples each having a thickness of 0.3 cm and a diameter of 100 mm. To measure the volume resistivity of those samples, used was a computing digital multimeter, TR6877 Model (manufactured by Takeda Riken Industry Co.).

Interlayer Adhesion Strength:

A tube sample to be tested was cut into strips each having a width of 10 mm, in which the adjacent layers were peeled at an angle of 180 degrees to determine the adhesion strength per the unit length of the strip sample.

Alcohol-gasoline Permeation Resistance:

A tube sample to be tested was cut to have a length of 30 cm. One end of the thus-cut tube sample was sealed, and an alcohol-gasoline mixture comprised of commercially-available regular gasoline and methyl alcohol in a ratio of 85/15 by weight was put thereinto. Then, the other end of the tube sample was sealed, and its total weight was measured. Next, this tube sample was kept in an explosion-proof oven at 40° C., whereupon the weight loss in the tube was measured. From those data, obtained was the alcohol-gasoline permeation resistance of the tube sample.

Mechanical Strength (for Examples 1 to 13, and Comparative Examples 1 to 3):

Pellets of an electroconductive PPS resin composition to be tested were molded through injection molding at a resin temperature. 320° C. and at a mold temperature of 150° C. The notched Izod impact strength of each of the thus-molded samples was measured according to ASTMD256.

Notched Izod Impact Strength (for Examples 33 to 42, and Comparative Examples 5 and 6):

Pellets of an electroconductive resin composition to be tested were molded through injection molding at a resin temperature of being higher than the melting point of the thermoplastic resin (F) by 50° C. and at a mold temperature of 80° C. The notched Izod impact strength of each of the thus-molded samples was measured according to ASTMD256. Inner Surface Smoothness (for Examples 1 to 13, and Comparative Examples 1 to 3):

The condition and the roughness of the inner surface of each tube sample were visually checked.

Surface Smoothness (for Examples 33 to 42, and Comparative Examples 5 and 6):

Pellets of a resin composition to be tested were put into a melt indexer (Type C-5059D2-1, manufactured by Toyo Seiki Co., having an orifice diameter of 0.0825 inches and an orifice length of 0.315 inches), kept therein at a temperature higher than the melting point of the thermoplastic resin in the resin composition by 60° C. for 5 minutes, and then extruded out therethrough under a load of 5 kg into a gut. This operation was effected 10 times to obtain 10 guts. These guts were projected, using a projector (Profile Projector, V-12, manufactured by Nikon Co.), and the number of the projections having a height of 25 m or larger that existed in the surface of each gut was counted. The length of each gut was 5 cm, and all 10 guts, totaling 50 cm, were checked in that manner to count the number of the projections. The data were averaged to obtain the number of the projections per cm of the guts.

Melt Viscosity (for Examples 33 to 42, and Comparative Examples 5 and 6):

Using a flow tester, pellets of a resin composition were tested at 270° C. and at a shear rate of 1000/sec to measure the melt viscosity of the composition.

Kink Resistance:

A tube sample was wound around a plurality of cylinders each having a different radius, R mm, whereupon the smallest radius, R mm, of one cylinder, around which the tube sample was wound without being bent in such a manner that the minor diameter of the thus-wound tube was not smaller than 50% of the diameter of the original tube, was measured. The thus-measured value, R mm indicates the kink resistance of the tube sample. The smaller the thus-measured value, R mm, is, the better flexibility the tube sample has.

Low-temperature Stiffness of Tubes:

Ten tube samples each having a length of 30 cm were kept in a cooling device at −40° C. for 4 hours. Then, the tube samples were taken out of the cooling device, and a ball weighing 0.454 kg was dropped down onto each tube sample at a height of 304.8 mm, whereupon the tube sample was checked as to whether or not it was broken.

REFERENCE EXAMPLE 1

Polymerization of PPS Resins

Sodium sulfide 9-hydrate (6.005 kg, 25 mols), sodium acetate (0.205 kg, 2.5 mols) and N-methyl-2-pyrrolidone (hereinafter referred to as NMP) (5 kg) were put into an autoclave equipped with a stirrer, and gradually heated up to 205° C. with introducing nitrogen into the autoclave and with removing water (3.6 liters) therefrom through distillation. Next, the autoclave was cooled to 180° C., into which were put 1,4-dichlorobenzene (3.719 kg, 25.3 mols) and NMP (3.7 kg). Then, this was sealed in nitrogen and heated up to 270° C., and the compounds therein were reacted at 270° C. for 2.5 hours. After having been cooled, the reaction product was washed 5 times with lukewarm water, and then dried at 80° C. under reduced pressure for 24 hours to obtain 2.45 kg of PPS (P-1).

The reaction product as prepared through the same polymerization as above was put into an autoclave equipped with a stirrer, along with 15 liters of ion-exchanged water and 13 ml of glacial acetic acid. Then, the autoclave was sealed in nitrogen, then heated up to 190° C., and thereafter cooled to 70° C. The thus-obtained slurry was filtered through centrifugation, and the resulting residue was washed with ion-exchanged water at 80° C., and thereafter dried in vacuum to obtain PPS (P-2).

The reaction product as prepared through the same polymerization as above was washed 5 times with lukewarm water, then heated at 100° C., put into NMP (10 kg), stirred for about 1 hour, and then filtered out. The resulting residue was washed several times with hot water. Next, this was put into an aqueous solution of acetic acid (pH 4) (25 liters), which was hot at 90° C., and stirred for about 1 hour. After having been taken out of the solution through filtration, this was washed with ion-exchange water which was at about 90° C., until the wash waste came to have a pH of 7. Next, this was dried under reduced pressure at 80° C. for 24 hours to obtain PPS (P-3). This PPS has a number-average molecular weight of 9,200 and a total wash content of 0.07% by weight.

Components used in the following Examples and Comparative Examples are as follows:

(G) Electroconductive Filler and/or Electroconductive Polymer:
- G-1: Carbon black (EC600JD, manufactured by Ketzen Black International Co.), having a DPB absorption of 495 ml/100 g, a specific surface area (as measured by a BET method) of 1270 m$^2$/g, a mean grain size of 30 nm, and an ash content of 0.2%.
- G-2: Carbon black (Mitsubishi Electroconductive Carbon Black #3050, manufactured by Mitsubishi Chemical Co.), having a DPB absorption of 180 ml/100 g, a specific surface area (as measured by a BET method) of 75 m$^2$/g, and an ash content of 0.2%.
- G-3: Flaky zinc powder, having a mean grain size of 1 mm.
- G-4: Pitch carbon fiber, having a fiber diameter of 13 m and a fiber length of 3 mm.

(B) Functional Group-having Thermoplastic Resin:
- B-1: Olefinic copolymer consisting essentially of an a-olefin and a glycidyl ester of an a,b-unsaturated acid: Ethylene/glycidyl methacrylate (88/12, % by weight) copolymer.
- B-2: Graft copolymer having a main skeleton of ethylene/glycidyl methacrylate (E/GMA=85/15, % by weight) and grafted with acrylonitrile/styrene (AS=30/70, % by weight), (E/GMA)/(AS)=70/30 (% by weight).
- B-3: Olefinic copolymer consisting essentially of an a-olefin and a glycidyl ester of an a,b-unsaturated acid: Ethylene/glycidyl methacrylate (94/6, % by weight) copolymer.
- B-4: Maleic anhydride (0.5 wt. %)-modified ethylene-propylene rubber.
- B-5: Maleic anhydride (0.5 wt. %) graft-modified ethylene-butene copolymer.

(C) Elastomer Having no Epoxy Groups, Acid Anhydride Groups, Carboxyl Group and its Salts and Carboxylate Groups:
- C-1: Ethylene/butene-1 (82/18, % by weight) copolymer.
- C-2: Ethylene/ethyl acrylate (85/15, % by weight) copolymer.
- C-3: Ethylene/propylene copolymer.

(D) Thermoplastic Resin Consisting Essentially of Repeating Units as Bonded Together Via at Least One Bonding Mode Selected From Amido Bonds, Ester Bonds and Urethane Bonds:
- D-1: Nylon 11 ("RILSAN" BESN O TL, manufactured by Toray Co.).
- D-2: Nylon 12 ("RILSAN" AESN O TL, manufactured by Toray Co.).
- D-3: ("AMILAN" CM1046X04, manufactured by Toray Co.).
- D-4: Polybutylene terephthalate (PBT 1400S, manufactured by Toray Co.)
- D-5: Polyurethane resin ("ELASTOLLAN" manufactured by Elastogram gmbh).
- D-6: Nylon 11 ("RILSAN" BESNO 20, manufactured by Toray Co.).

(F) Thermoplastic Resin:
- F-1: Pellets of nylon 12 (having a relative viscosity of 2.2).
- F-2: Pellets of nylon 12 (having a relative viscosity of 1.4).
- F-3: Powder of nylon 12 (having a relative viscosity of 1.4). This has a weight-average grain size of 0.8 mm.

F-4: Powder of nylon 12 (having a relative viscosity of 2.2). This has a weight-average grain size of 0.8 mm.

The relative viscosity of these polymers was measured in meta-cresol (having a polymer concentration of 0.5% by weight), at 25° C. The weight-average grain size of these polymer powders was measured through centrifugal precipitation.

F-5: Pellets of nylon 6 (having a relative viscosity of 2.4).

The relative viscosity of the polymer was measured in 98% concentrated sulfuric acid solution (containing 1 g of polymer in 100 ml of concentrated sulfuric acid) at 25° C.

F-6: Polybutylene terephthalate (having a relative viscosity of 2.0).

The relative viscosity of the polymer was measured in 0.5% ortho-chlorophenol solution at 25° C.

Thermoplastic Resin Except Polyphenylene Sulfide Resins, for the Layer (b):

b-1: Nylon 11 ("RILSAN" BESN BK P20TL, manufactured by Toray Co.), having a Young's modulus of 5,000.

b-2: Nylon 12 ("RILSAN" AESN BK P20TL, manufactured by Toray Co.), having a Young's modulus of 5,000.

b-3: Polybutylene terephthalate (PBT 1404X04, manufactured by Toray Co.), having a Young's modulus of 15,000.

b-4: Polyurethane resin ("ELASTOLLAN" E598PNAT), having a Young's modulus of 3,000.

b-5: Polyolefin resin ("Hi-Zex" 3000B, manufactured by Mitsui Petro-chemical Co.), having a Young's modulus of 10,000.

b-6: Nylon 6 ("AMILLAN" CM1056, manufactured by Toray Co.).

(E) Alkoxysilane Compound:

E-1: b-(3,4-epoxycyclohexyl)ethyltrimethoxysilane

Resin Composition for Layer (E):

(e-1): Composition comprised of 55% by weight of polyphenylene sulfide (having a melt viscosity of 900 poises at 310 C and at a shear rate of 1000/sec), 20% by weight of Nylon 12 (this is the same as A-1 mentioned above), and 25% by weight of functional group-having thermoplastic resin (this is the same as C-2 mentioned above).

(e-2): Nylon 12 ("RILSAN" AESN O TL, manufactured by Toray Co.).

EXAMPLES 1 to 15, AND COMPARATIVE EXAMPLES 1 to 3

The constituent components shown in Tables 1 to 3 were dry-blended in the ratio also shown in Tables 1 to 3, then pre-mixed for 2 minutes in a tumbler, and thereafter melt-kneaded through a double-screw extruder of which the temperature of the cylinder fell between 300 and 320° C. The resulting melt was pelletized, using a strand cutter, and then dried overnight at 120° C. The pellets were molded into moldings, of which the volume resistivity and the mechanical strength were measured.

On the other hand, two-layered tubes were molded, of which the inner layer was made from the pelletized PPS resin as hereinabove and the outer layer was from the thermoplastic resin composition as in Tables 1 to 3.

For the molding of those tubes, used were two extruders. The resins as extruded out through the two extruders were collected, using an adapter. Also used were a die through which the thus-collected resins were molded into two-layered tubes, a sizing die for cooling the tubes with controlling their size, and a take-up device.

The two-layered tubes each had an outer diameter of 8 mm, an inner diameter of 6 mm, an outer layer thickness of 0.9 mm and an inner layer thickness of 0.1 mm. The two-layered tubes were tested, and the data obtained are shown in Tables 1 to 3.

TABLE 1

| | Components | Examples | | | | | | | |
|---|---|---|---|---|---|---|---|---|---|
| | | 1 | 2 | 3 | 4 | 5 | 6 | 7 | 8 |
| Outer layer | (b) Thermoplastic resin | b-3 | b-3 | b-3 | b-1 | b-1 | b-1 | b-1 | b-1 |
| | | 100 | 100 | 100 | 100 | 100 | 100 | 100 | 100 |
| Inner layer | (A) PPS | P-3 | P-3 | P-3 | P-3 | P-3 | P-3 | P-1 | P-3 |
| | | 100 | 100 | 100 | 100 | 100 | 100 | 100 | 100 |
| | (G) Electroconductive material | G-1 | G-1 | G-1 | G-1 | G-1 | G-1 | G-1 | G-1 |
| | | 5 | 8.8 | 10 | 7.5 | 10 | 10 | 10 | 10 |
| | (B) [Functional group having t] Thermoplastic resin having functional groups | | B-1 | B-1 | | B-1 | B-1 | B-1 | B-1 |
| | | | 75 | 50 | | 50 | 10 | 10 | 10 |
| | (C) Elastomer with no functional group | | | | | | C-1 | C-1 | C-1 |
| | | | | | | | 40 | 40 | 40 |
| | (D) Thermoplastic resin | | | | D-4 | D-1 | D-1 | D-1 | D-1 | D-3 |
| | | | | | 50 | 50 | 50 | 50 | 50 | 50 |
| Interlayer adhesion strength (kg/10 mm) | | 0.1 | 1.5 | 3.5 | 1.5 | 3.2 | 4.1 | 3.5 | 3.2 |
| Alcohol-gasoline permeation resistance (g · mm/m$^2$ · day) | | 0.5 | 0.8 | 1.0 | 1.0 | 1.3 | 1.2 | 1.2 | 1.2 |
| Inner surface smoothness | | A | A | A | A | B | A | B | A |
| Volume resistivity of inner layer composition ($_{1/2}$ · cm) | | $5 \times 10^2$ | $7 \times 10^2$ | $7 \times 10^2$ | $8 \times 10^2$ | $8 \times 10^2$ | $7 \times 10^2$ | $7 \times 10^2$ | $7 \times 10^2$ |
| Notched Izod impact strength of inner layer composition (J/M) | | 8 | 25 | 32 | 12 | 30 | 45 | 28 | 41 |

For Each component, the upper part indicates the compound while the lower part indicates its amount (wt. pts.).

TABLE 2

| Components (wt. pts.) | | Examples | | | | | Comparative Examples | | |
|---|---|---|---|---|---|---|---|---|---|
| | | 9 | 10 | 11 | 12 | 13 | 1 | 2 | 3 |
| Outer layer | (b) Thermoplastic resin | b-2 | b-2 | b-5 | b-4 | b-1 | b-3 | b-1 | b-2 |
| | | 100 | 100 | 100 | 100 | 100 | 100 | 100 | 100 |
| Inner layer | (A) PPS | P-2 | P-3 | P-3 | P-3 | P-3 | P-3 | | |
| | | 100 | 100 | 100 | 100 | 100 | 100 | | |
| | (G) Electroconductive material | G-1 | G-2 | G-3 | G-2 | G-1 | | | |
| | | 10 | 10 | 50 | 50 | 10 | | | |
| | | | | B-4 | | | | | |
| | | | | 20 | | | | | |
| | (B) [Functional group-having t] Thermoplastic resin having functional groups | B-2 | B-2 | B-2 | B-2 | B-1 | | | |
| | | 10 | 25 | 15 | 10 | 10 | | | |
| | | | | B-4 | | | | | |
| | | | | 10 | | | | | |
| | (C) Elastomer with no functional group | C-1 | C-1 | C-1 | C-2 | C-1 | | | |
| | | 40 | 50 | 30 | 40 | 40 | | | |
| | (D) Thermoplastic resin | D-2 | D-2 | | D-5 | D-1 | | | |
| | | 50 | 50 | | 50 | 50 | | | |
| | (E) Alkoxysilane Compound | | | | | E-1 | | | |
| | | | | | | 0.7 | | | |
| Interlayer adhesion strength (kg/10 mm) | | 4.1 | 4.2 | 1.5 | 3.2 | 4.4 | 0.0 | | |
| Alcohol-gasoline permeation resistance (g · mm/m$^2$ · day) | | 1.0 | 5.2 | 1.8 | 1.2 | 1.2 | 0.5 | 150 | 180 |
| Inner surface smoothness | | A | B | A | A | A | B | A | A |
| Volume resistivity of inner layer composition ($_{1/2}$ · cm) | | $4 \times 10^2$ | $5 \times 10^4$ | $9 \times 10^2$ | $4 \times 10^5$ | $6 \times 10^2$ | $10^{16}$ | | |
| Notched Izod impact strength of inner layer composition (J/M) | | 41 | 40 | 25 | 25 | 53 | 12 | | |

For each component, the upper part indicates the compound while the lower part indicates its amount (wt. pts.).

TABLE 3

| Components | | Examples | |
|---|---|---|---|
| | | 14 | 15 |
| Outer layer | (b) Thermoplastic resin | b-3 | b-3 |
| | | 100 | 100 |
| Inner layer | (A) PPS | P-3 | P-3 |
| | | 100 | 100 |
| | (G) Electroconductive material | G-1 | G-1 |
| | | 7.5 | 7.5 |
| | (B) [Functional group-having t] Thermoplastic resin having functional groups | B-1/B-5 | B-1/B-4 |
| | | 8.3/17.3 | 13.3/26.7 |
| | (C) Elastomer with no functional group | C-1 | C-3 |
| | | 17.3 | 26.7 |
| | (D) Thermoplastic resin | | |
| Interlayer adhesion strength (kg/10 mm) | | 1.6 | 1.6 |
| Alcohol-gasoline permeation resistance (g · mm/m$^2$ · day) | | 0.8 | 0.8 |
| Inner surface smoothness | | A | A |
| Volume resistivity of inner layer composition (½ · cm) | | $7 \times 10^2$ | $7 \times 10^2$ |
| Notched Izod impact strength of inner layer composition (J/M) | | 180 | 210 |

For each component, the upper part indicates the compound while the lower part indicates its amount (wt.pts.).

As is understood from the comparison between the data of Comparative Examples 2 and 3 and those of Example 1, the tubes having an inner layer of an electroconductive PPS composition have higher electroconductivity and higher alcohol-gasoline permeation resistance.

In Comparative Example 1, no electroconductive filler was used. The tube samples of Comparative Example 1 have a high volume resistivity, and the walls of those tube samples were much roughened to have poor inner surface smoothness.

As is understood from the comparison between the data of Example 1 and those of Example 2, and from the comparison between the data of Example 4 and those of Example 5, the addition of the functional group-having thermoplastic resin (B) to the resin composition is effective in improving the impact strength of the moldings and also in improving the interlayer adhesion of the moldings.

As is understood from the comparison between the data of Example 5 and those of Example 6, the addition of the elastomer (C) having no epoxy groups, acid anhydride groups, carboxyl group and its salts and carboxylate groups to the resin composition is effective in improving the interlayer adhesion, the inner surface smoothness and the impact strength of the moldings.

As is understood from the comparison between the data of Example 2 and those of Example 3, and from the comparison between the data of Example 1 and those of Example 4, the addition of the thermoplastic resin (D) consisting essentially of repeating units as bonded together via at least one bonding mode selected from amido bonds, ester bonds and urethane bonds to the resin composition is effective in improving the interlayer adhesion of the moldings. As is understood from the comparison between the data of Example 6 and those of Example 8, the thermoplastic resin other than the PPS resin for the layer (b) is preferably the same as the thermoplastic resin (D) consisting essentially of repeating units as bonded together via at least one bonding mode selected from amido bonds, ester bonds and urethane bonds with respect to the repeating units constituting them, as ensuring higher interlayer adhesion of the moldings.

As is understood from the comparison between the data of Example 6 and those of Example 7, the use of the de-ionized PPS is effective in producing the moldings having higher impact strength and higher interlayer adhesion strength and having better inner surface smoothness.

As is understood from the comparison between the data of Example 6 and those of Example 13, the addition of the alkoxysilane compound (E) to the resin composition is effective not only in improving the impact resistance of the moldings but also in improving the interlayer adhesion thereof.

REFERENCE EXAMPLE 2

Preparation of Composition for Layer (a)

The constituent components shown in Table 4 were dry-blended in the ratio also shown in Table 4, then pre-mixed for 2 minutes in a tumbler, and thereafter melt-kneaded through a single-screw extruder (screw: DULMAGE), of which the temperature of the cylinder fell between 300 and 320° C. The resulting melt was pelletized, using a strand cutter, and then dried overnight at 120° C.

REFERENCE EXAMPLE 3

Preparation of Composition for Layer (c)

The constituent components shown in Table 5 were dry-blended in the ratio also shown in Table 5, then pre-mixed for 2 minutes in a tumbler, and thereafter melt-kneaded through a double-screw extruder of which the temperature of the cylinder was higher than the melting point of the thermoplastic resin being melt-kneaded by from 30 to 50° C. The resulting melt was pelletized, using a strand cutter, and then dried overnight at a temperature falling between 80 and 120° C. The pellets were molded into moldings, of which the volume resistivity was measured.

EXAMPLES 16 to 34, AND COMPARATIVE EXAMPLE 4

The pellets of the resin compositions prepared above were molded into three-layered tubes.

For the molding of those tubes, used were three extruders. The resins as extruded out through the three extruders were collected, using an adapter. Also used were a die through which the thus-collected resins were molded into three-layered tubes, a sizing die for cooling the tubes with controlling their size, and a take-up device.

The three-layered tubes each had an outer diameter of 8 mm, an inner diameter of 6 mm, an outer layer thickness of 0.75 mm, an interlayer thickness of 0.15 mm and an inner layer thickness of 0.1 mm. The three-layered tubes were tested, and the data obtained are shown in Tables 6 and 7.

TABLE 4

| Components | Composition for Layer (a) | | | | | | | | | | |
|---|---|---|---|---|---|---|---|---|---|---|---|
| | a-1 | a-2 | a-3 | a-4 | a-5 | a-6 | a-7 | a-8 | a-9 | a-10 | a-11 |
| (A) PPS | P-3 | P-3 | P-3 | P-3 | P-3 | P-1 | P-3 | P-3 | P-3 | P-3 | P-3 |
|  | 100 | 100 | 100 | 100 | 100 | 100 | 100 | 100 | 100 | 100 | 100 |
| (B) [Functional group-having t] Thermoplastic resin having functional groups | B-1 | B-1/B-4 | B-1/B-4 | B-1/B-2 | B-1 | B-1 | B-1 | B-1 | B-1 |  | B-1 |
|  | 16 | 6/20 | 5/5 | 10/16 | 16 | 16 | 16 | 21 | 16 |  | 16 |
| (C) Elastomer with no functional group | C-1 | C-1 | C-1 | C-1 | C-1 | C-1 | C-1 | C-1 | C-1 |  | C-1 |
|  | 34 | 24 | 15 | 24 | 34 | 34 | 34 | 21 | 34 |  | 34 |
| (D) Thermoplastic resin | D-1 | D-1 | D-1 | D-2 | D-3 | D-1 | D-4 |  | D-5 | D-1 | D-1 |
|  | 50 | 50 | 42 | 50 | 50 | 50 | 50 |  | 50 | 50 | 50 |
| (E) Alkoxysilane |  |  |  |  |  |  |  |  |  |  | E-1 |
|  |  |  |  |  |  |  |  |  |  |  | 0.5 |

For each component, the upper part indicates the compound while the lower part indicates its amount (wt. pts.).

TABLE 5

| Components | Composition for Layer (c) | | | | | | | | |
|---|---|---|---|---|---|---|---|---|---|
| | c-1 | c-2 | c-3 | c-4 | c-5 | c-6 | c-7 | c-8 | c-9 |
| (F) Thermoplastic resin | D-1 | D-2 | D-1 | D-4 | D-5 | D-6 | P-3 | P-3 | P-3 |
|  | 100 | 100 | 100 | 100 | 100 | 100 | 100 | 100 | 100 |
| (B) [Functional group-having e] Elastomer having functional groups | B-4 |  | B-4 | B-1 | B-1 | B-4 | B-1/B-5 | B-1/B-4 | B-1 |
|  | 8 |  | 5 | 8 | 8 | 8 | 8.3/17.3 | 13.3/26.7 | 25.6 |
| (C) Elastomer with no functional group |  |  | C-3 |  |  |  | C-1 | C-3 | C-1 |
|  |  |  | 5 |  |  |  | 17.3 | 26.7 | 17.3 |
| (G) Electroconductive material | G-1 | G-1 | G-1 | G-2 | G-1 | G-1 | G-1 | G-1 | G-1 |
|  | 6.4 | 6.4 | 8.7 | 45 | 6.7 | 6.7 | 5.3 | 5.3 | 5.3 |
| Volume resistivity ($_{1/2}$ · cm) | $4 \times 10^3$ | $5 \times 10^3$ | $9 \times 10^2$ | $4 \times 10^5$ | $6 \times 10^3$ | $6 \times 10^4$ | $4 \times 10^2$ | $6 \times 10^2$ | $6 \times 10^2$ |

For Each component, the upper part indicates the compound while the lower part indicates its amount (wt. pts.).
(*): The amount is in terms of part by weight relative to the total amount of the thermoplastic resin and the elastomer(s) of being 100 parts by weight.

TABLE 6

| | Examples | | | | | | | |
|---|---|---|---|---|---|---|---|---|
| Components | 16 | 17 | 18 | 19 | 20 | 21 | 22 | 23 |
| Outer layer | b-1 | b-1 | b-1 | b-1 | b-1 | b-2 | b-1 | b-6 |
| Interlayer | a-1 | a-2 | a-3 | a-2 | a-1 | a-4 | a-6 | a-5 |
| Inner layer | c-1 | c-1 | c-1 | c-2 | c-4 | c-1 | c-1 | c-6 |
| Outer layer/interlayer adhesion strength (kg/10 mm) | 3.2 | 3.8 | 2.8 | 3.8 | 3.2 | 3.2 | 2.0 | 2.0 |
| Inner layer/interlayer adhesion strength (kg/10 mm) | 4.1 | 4.5 | 3.1 | 4.5 | 4.1 | 1.5 | 2.0 | 1.9 |
| Alcohol-gasoline permeation resistance (g · mm/m² · day) | 1.8 | 1.0 | 0.7 | 1.4 | 1.4 | 5.2 | 2.9 | 7.4 |
| Kink resistance (R, mm) | 25 | 20 | 25 | 35 | 35 | 30 | 30 | 35 |

TABLE 7

| Components | Examples | | | | | | | | | | | Comparative Examples 4 |
|---|---|---|---|---|---|---|---|---|---|---|---|---|
| | 24 | 25 | 26 | 27 | 28 | 29 | 30 | 31 | 32 | 33 | 34 | |
| Outer layer | b-3 | b-3 | b-4 | b-5 | b-1 | b-1 | b-1 | b-1 | b-1 | b-1 | b-1 | b-1 |
| Interlayer | a-8 | a-7 | a-9 | a-8 | a-1 | a-8 | a-10 | a-11 | a-2 | A-2 | A-2 | |
| Inner layer | c-4 | c-4 | c-5 | c-4 | c-2 | c-1 | c-1 | c-1 | c-7 | c-8 | c-9 | c-1 |
| Outer layer/interlayer adhesion strength (kg/10 mm) | 2.2 | 3.2 | 2.8 | 2.0 | unpeelable | 0.8 | 1.2 | 3.7 | 3.8 | 3.7 | 3.5 | unpeelable |
| Inner layer/interlayer adhesion strength (kg/10 mm) | 2.9 | 4.1 | 3.2 | 2.9 | 3.5 | 1.0 | 1.3 | 4.3 | unpeelable | unpeelable | unpeelable | |
| Alcohol-gasoline permeation resistance (g · mm/m$^2$ · day) | 1.4 | 1.3 | 2.3 | 3.2 | 1.4 | 3.2 | 2.8 | 1.9 | 0.5 or less | 0.5 or less | 0.5 or less | 150 |
| Kink resistance (R, mm) | 30 | 30 | >35 | 30 | 20 | 25 | >35 | 20 | 25 | 25 | 35 | 20 |

As is understood from the comparison between the data of Comparative Example 4 and those of Examples, the tube moldings satisfying the constitution of the invention have good alcohol-gasoline permeation resistance. As not having any PPS composition layer, the tube moldings of Comparative Example 1 have poor alcohol-gasoline permeation resistance.

From the data of Examples 24 and 27, it is known that the tube moldings of which the outer layer contained PBT and the inner layer contained polyethylene have relatively good interlayer adhestion even though the thermoplastic resin (D) was not added to those layers. However, as is known from Examples 14 and 27 in which both the outer layer and the inner layer constituting the tube moldings contained nylon 11, the additon of the thermoplastic resin (D) to the layers greatly improves the interlayer adhesion of the moldings.

In addition, as is further known from Examples 16 and 21, the interlayer adhesion between the interlayer and the inner layer adjacent thereto is higher when those two adjacent layers contain nylon of the same kind.

As is known from Examples 16 and 30, the components (B) and (C) in the layer (a) contribute the improvement in the interlayer adhesion of the tube moldings.

As is known from Examples 16 and 23, nylon 6 is preferred to nylon 11 and nylon 12 as the polyamide resin to be in the layer (b), since the former is more effective than the latter two in improving the kink resistance, the interlayer adhesion and the alcohol-gasoline permeation resistance of the tube moldings.

As is understood from the comparison between the data of Example 16 and those of Example 22, the use of the de-ionized PPS is effective in much improving the kink resistance and the interlayer adhesion of the tube moldings.

EXAMPLES 35, 38 AND 43

The constituent components shown in Table 8 were dry-blended in the ratio also shown in Table 8, then pre-mixed for 2 minutes in a tumbler, and thereafter melt-kneaded through a double-screw extruder of which the temperature of the cylinder was higher than the melting point of the thermoplastic resin (F) by 35° C. The resulting melt was pelletized, using a strand cutter, and then dried overnight. The melt viscosity of the pellets was measured. In addition, the pellets were molded into moldings, of which the impact strength, the volume resistivity and the surface smoothness were measured. The data obtained are shown in Table 8.

EXAMPLES 36, 37, AND 39 to 43

Of the constituent components shown in Table 8, the thermoplastic resin (F) and the electroconductive filler (G) were dry-blended in the ratio shown in Table 8, then pre-mixed for 2 minutes in a tumbler, and thereafter melt-kneaded through a double-screw extruder of which the temperature of the cylinder was higher than the melting point of the thermoplastic resin (F) by 35° C. The resulting melt was pelletized, using a strand cutter, and then dried overnight. Next, the pellets were pre-mixed with the thermoplastic resin having functional groups (B) (along with the elastomer free of functional groups (C) in Example 42) in a tumbler for 2 minutes, as in Table 8, and then melt-kneaded through a double-screw extruder of which the temperature of the cylinder was higher than the melting point of the thermoplastic resin (F) by 35° C. The resulting melt was pelletized, using a strand cutter, and then dried overnight. The melt viscosity of the pellets was measured. In addition, the pellets were molded into moldings, of which the impact strength, the volume resistivity and the surface smoothness were measured. The data obtained are shown in Table 8.

COMPARATIVE EXAMPLES 5 AND 6

As in Table 8, the constituent components were melt-kneaded, pelletized and dried in the same manner as in Examples 33 and 36, except that F-2 was used as the thermoplastic resin (F). The melt viscosity of the pellets was measured. In addition, the pellets were molded into moldings, of which the impact strength, the volume resistivity and the surface smoothness were measured. The data obtained are shown in Table 8.

Test for Tube Moldability (1):

Two-layered tubes were molded, using (e-2) for the outer layer and the pellets as prepared in Example 38 or in Comparative Example 6 for the inner layer. The two-layered tubes each had an outer diameter of 8 mm, an inner diameter of 6 mm, an outer layer thickness of 0.8 mm and an inner layer thickness of 0.2 mm. For the molding of those tubes, used were two single-screw (65 mmf) extruders. The resins as extruded out through the two extruders at a resin temperature of 240° C. were collected, using an adapter. Also used were a die through which the thus-collected resins were molded into two-layered tubes, a sizing die for cooling the tubes with controlling their size, and a take-up device with which the molded tubes were taken up at a take-up speed of 50 cm/min. The tube samples were tested for their inner surface smoothness and low-temperature stiffness.

The tube samples for which the pellets of Comparative Example 6 were used had projections on their inner surface, and they had poor inner surface smoothness. Five of ten tube samples of Comparative Example 6 were cracked in the low-temperature stiffness test.

As opposed to those, the tube samples for which the pellets of Example 36 were used had good inner surface smoothness. None of ten tube samples of Example 36 was cracked in the low-temperature stiffness test.

Test for Tube Moldability (2):

Three-layered tubes were molded, using (e-2) for the outer layer, (e-1) for the interlayer, and the pellets as prepared in Example 37 or in Comparative Example 5 or 6 for the inner layer. The three-layered tubes each had an outer diameter of 8 mm, an inner diameter of 6 mm, an outer layer thickness of 0.7 mm, an interlayer thickness of 0.15 mm and an inner layer thickness of 0.1 mm. For the molding of those tubes, used were three single-screw (65 mmf) extruders. The resins as extruded out through the three extruders at a resin temperature falling between 210 and 290° C. were collected, using an adapter which was at a temperature falling between 270 and 290°. Also used were a die through which the thus-collected resins were molded into three-layered tubes, a sizing die for cooling the tubes with controlling their size, and a take-up device with which the molded tubes were taken up at a take-up speed of 50 cm/min. The tube samples were tested for their inner surface smoothness and low-temperature stiffness.

The tube samples for which the pellets of Comparative Example 5 or 6 were used had projections on their inner surface, and they had poor inner surface smoothness. Two of ten tube samples of Comparative Example 5, and six of ten tube samples of Comparative Example 6 were cracked in the low-temperature stiffness test. In Comparative Example 6, in addition, since the resin compositions used had too low viscosity, the melt tubes were flattened and could not be truly circular. As opposed to those, the tube samples for which the pellets of Example 37 were used had good inner surface smoothness. None of ten tube samples of Example 37 was cracked in the low-temperature stiffness test.

adhesion enhancing interlayer of (a) a polyphenylene sulfide composition; an outermost layer of (b) a thermoplastic resin composition consisting essentially of a thermoplastic resin other than a polyphenylene sulfide resin; and an innermost layer of (c) an electroconductive, thermoplastic resin composition comprising an electroconductive filler and/or an electroconductive polymer, wherein said polyphenylene sulfide resin composition of said layer (a) comprises (A) 100 parts by weight of a polyphenylene sulfide resin and (B) from 1 to 200 parts by weight of an olefinic copolymer containing at least one functional group selected from the group consisting of epoxy groups, acid anhydride groups, carboxyl groups and their salts, and carboxylate groups, wherein said thermoplastic resin of said layer (c) is at least one selected from the group consisting of polyphenylene sulfides, polyamide resins, and thermoplastic polyester resins, wherein said electroconductive, thermoplastic resin composition of said electroconductive layer has a volume resistivity of not larger than $10^{10}$ Ω·cm.

2. The electroconductive, multilayered fuel tube as claimed in claim 1, wherein said thermoplastic resin composition of said layer (b) is at least one selected from the group consisting of polyamide resins, thermoplastic polyester resins, thermoplastic polyurethane resins and polyolefin resins.

3. The electroconductive, multilayered fuel tube as claimed in claim 1, wherein layer (b) has a Young's modulus of not larger than 18,000 kg/cm$^2$.

4. The electroconductive, multilayered fuel tube as claimed in claim 1, said resin composition of said layer (b) is a polyamide resin comprising amido units each having from 8 to 15 carbon atoms per amido group.

5. The electroconductive, multilayered fuel tube as claimed in claim 1, wherein said olefinic copolymer (B) is

TABLE 8

| Components | Examples | | | | | | | | | Comparative Examples | |
|---|---|---|---|---|---|---|---|---|---|---|---|
| | 35 | 36 | 37 | 38 | 39 | 40 | 41 | 42 | 43 | 5 | 6 |
| (F) Thermoplastic resin | F-1<br>100 | F-1<br>100 | F-1<br>100 | F-3<br>100 | F-5<br>100 | F-1<br>100 | F-1<br>100 | F-6<br>100 | F-4<br>100 | F-2<br>100 | F-2<br>100 |
| (G) Electroconductive filler | G-1<br>7 | G-1<br>8 | G-1<br>7 | G-1<br>6.5 | G-1<br>7 | G-1<br>7 | G-2<br>48 | G-1<br>10 | G-1<br>7 | G-1<br>7 | G-1<br>6.5 |
| (B) [Functional group-having t] Thermoplastic resin having functional groups | B-4<br>8 | B-4<br>18 | B-4<br>8 | | B-4<br>8 | B-3/B-4<br>4/4 | B-4<br>11 | B-1<br>3 | B-4<br>8 | B-4<br>8 | |
| (C) Elastomer with no functional group | | | | | | | | C-1<br>9 | | | |
| Notched Izod impact strength (J/m) | 245 | 420 | 325 | 85 | 75 | 290 | 55 | 110 | 325 | 160 | 70 |
| Surface smoothness (number of projections/cm) | 2.0 | 0.5 or less | 0.5 or less | 1.0 | 1.5 | 0.5 or less | 3.0 | 1.0 | 0.5 or less | 10 or more | 10 or more |
| Melt viscosity (poise) | 5100 | 6300 | 5200 | 900 | 12000 | 7200 | 12000 | 13000 | 5200 | 4900 | 900 |
| Volume resistivity ($_{1/2}$ · cm) | $4 \times 10^3$ | $1 \times 10^3$ | $2 \times 10^3$ | $7 \times 10^2$ | $4 \times 10^2$ | $7 \times 10^3$ | $4 \times 10^4$ | $1 \times 10^4$ | $8 \times 10^2$ | $4 \times 10^4$ | $9 \times 10^3$ |
| Number of kneading steps(*) | 1 | 2 | 2 | 1 | 2 | 2 | 2 | 2 | 1 | 1 | 1 |

For Each component, the upper part indicates the compound while the lower part indicates its amount (wt. pts.).
(*)Number of kneading steps:
1: The constituent components were melt-kneaded all at once.
2: The thermoplastic resin (F) and the electroconductive filler (G) were melt-kneaded and then pelletized, and the resulting pellets were melt-kneaded with the [functional group-having] thermoplastic resin having functional groups (B) (along with the functional group-free elastomer (C) in Example 42).

What is claimed is:

1. An electroconductive, multilayered fuel tube comprising three thermoplastic resin layers, a non-electroconductive an olefinic copolymer (B1) having at least one epoxy group, consisting essentially of an a-olefin and a glycidyl ester of an a,b-unsaturated acid.

6. The electroconductive, multilayered fuel tube as claimed in claim 5, wherein said olefinic copolymer (B1) comprises (1) an a-olefin, (2) a glycidyl ester of an a,b-unsaturated acid, and (3) a monomer represented by the formula:

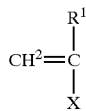

wherein $R^1$ represents a hydrogen atom or a lower alkyl group; X represents —$COOR^2$, —CN or an aromatic group; $R^2$ and represents an alkyl group having from 1 to 10 carbon atoms.

7. The electroconductive, multilayered fuel tube as claimed in claim 1, wherein said layer (a) comprises at least two olefinic copolymers having functional groups (B) comprising (B1) an olefinic copolymer having at least one epoxy group, and (B2) an olefinic copolymer having at least one acid anhydride group, and wherein the ratio of (B1)/(B2), is 1/99 to 99/1 wt % wherein the total of (B1) and (B2) is 100% by weight.

8. The electroconductive, multilayered fuel tube as claimed in claim 1, wherein said layer (a) further comprises (C) from 1 to 200 parts by weight, relative to 100 parts by weight of the polyphenylene sulfide resin (A), of an elastomer having no epoxy groups, acid anhydride groups, carboxyl groups and their salts, or carboxylate groups, with the total of said olefinic copolymer (B) and said elastomer (C) being not larger than 200 parts by weight relative to 100 parts by weight of said polyphenylene sulfide resin (A).

9. The electroconductive, multilayered fuel tube as claimed in claim 1, said layer (a) further comprises (D) from 5 to 200 parts by weight, relative to 100 parts by weight of the polyphenylene sulfide resin (A), of a thermoplastic resin consisting essentially of repeating units bonded together via at least one bonding mode selected the group consisting of amido bonds, ester bonds, and urethane bonds.

10. The electroconductive, multilayered fuel tube as claimed in claim 9, wherein said thermoplastic resin (D) is a polyamide resin.

11. The electroconductive, multilayered fuel tube as claimed in claim 1, said layer (a) further comprises (E) from 0.05 to 5 parts by weight, relative to 100 parts by weight of the polyphenylene sulfide resin (A), of an alkoxysilane compound having at least one functional group selected from the group consisting of epoxy groups, amino groups, isocyanato groups, hydroxyl groups, mercapto groups and ureido groups.

12. The electroconductive, multilayered fuel tube as claimed in claim 1, wherein said polyphenylene sulfide resin of said center layer (a) is de-ionized.

13. The electroconductive, multilayered fuel tube as claimed in claim 1, wherein said layer (c) comprises 100 parts by weight of a resin composition comprising (F) from 0 to 98% by weight of a thermoplastic resin; (B) from 2 to 60% by weight of an olefinic copolymer having at least one functional group selected from the group consisting of epoxy groups, acid anhydride groups, carboxyl groups and their salts, and carboxylate groups; and (C) from 0 to 58% by weight of an elastomer having no epoxy groups, acid anhydride groups, carboxyl groups and their salts, or carboxylate groups; and (G) from 1 to 100 parts by weight of an electroconductive filler or an electroconductive polymer.

14. The electroconductive, multilayered fuel tube as claimed in claim 1, wherein said electroconductive filler or polymer (G) of said layer (c) is non-fibrous or, having a ratio of length/diameter, of not larger than 200.

15. The electroconductive, multilayered fuel tube as claimed in claim 14, wherein said electroconductive filler (G) of said layer (c) is carbon black.

16. The electroconductive, multilayered fuel tube as claimed in claim 1, wherein said electroconductive filler (G) of layer (c) is carbon black having a surface area of not smaller than 500 $m^2$/g.

17. The electroconductive, multilayered fuel tube as claimed in claim 13, wherein said thermoplastic resin (F) of said layer (c) is a polyphenylene sulfide resin; said electroconductive, thermoplastic resin composition of layer (c) is a polyphenylene sulfide resin composition comprising at least two olefinic copolymers having functional groups (B) comprising (B1) an olefinic copolymer having at least one epoxy group and (B2) and olefinic copolymer having at least one acid anhydride group wherein the ratio (B1)/(B2) is 1/99 and 99/1 wt % and the total of (B1) and (B2) is 100% by weight.

18. The electroconductive, multilayered fuel tube as claimed in claim 1, wherein said electroconductive, thermoplastic resin composition of said electroconductive layer has a volume resistivity of larger than 100 Ω·cm but not larger than $10^{10}$ Ω·cm.

19. The electroconductive, multilayered fuel tube as claimed in claim 1, wherein said molding has a total thickness of 0.2 mm to 3 mm and wherein said electroconductive layer has a thickness of 1% to 50% of the total thickness of the molding.

* * * * *

UNITED STATES PATENT AND TRADEMARK OFFICE
CERTIFICATE OF CORRECTION

PATENT NO.    : 6,723,400 B1
DATED         : April 20, 2004
INVENTOR(S)   : Ishio et al It is certified that error appears in the above-identified patent and that said Letters Patent is hereby corrected as shown below:

Column 4,
Line 5, in the formula, please change "R" to -- $R^1$ --.

Column 10,
Line 5, please change "300º" to -- 300ºC --;
Line 8, please change "150º" to -- 150ºC --.

Column 14,
Line 29, please change "g-ureido propyltriethoxysilane" to
-- g-ureidopropyltriethoxysilane --.

Column 27,
Table 1, Components (wt.pts.), (B), please delete "[Functional group-having t]".

Column 29,
Table 2, Components (wt.pts.), (B), please delete "[Functional group-having t]";
Table 3, Components (wt.pts.), (B), please delete "[Functional group-having t]".

Column 30,
Line 60, please change "de-ionized" to -- deionized --.

Column 31,
Table 4, Components (wt.pts.), (B), please delete "[Functional group-having t]";
Table 5, Components (wt.pts.), (B), please delete "[Functional group-having t]".

Column 33,
Line 65, please change "43" to -- 42 --.

UNITED STATES PATENT AND TRADEMARK OFFICE
CERTIFICATE OF CORRECTION

PATENT NO.    : 6,723,400 B1
DATED         : April 20, 2004
INVENTOR(S)   : Ishio et al It is certified that error appears in the above-identified patent and that said Letters Patent is hereby corrected as shown below:

Column 35,
Table 8, Components (wt.pts.), (B), please delete "[Functional group-having t]"; and after Table 8, number 2, please delete "[Functional group-having]".

Signed and Sealed this

Twenty-eighth Day of June, 2005

JON W. DUDAS
*Director of the United States Patent and Trademark Office*